United States Patent [19]

Ota et al.

[11] Patent Number: 5,764,854
[45] Date of Patent: Jun. 9, 1998

[54] DATA PROCESSOR FOR PERFORMING A FUZZY LOGIC WEIGHTING FUNCTION AND METHOD THEREFOR

[75] Inventors: Ken Ota, Yokohami, Japan; William C. Archibald, Austin, Tex.

[73] Assignee: Motorola, Inc., Schaumburg, Ill.

[21] Appl. No.: 490,967

[22] Filed: Jun. 15, 1995

[51] Int. Cl.[6] .................................................. G06F 15/18
[52] U.S. Cl. .................................................................. 395/3
[58] Field of Search ............................ 395/3, 51, 11

[56] References Cited

U.S. PATENT DOCUMENTS

| | | | |
|---|---|---|---|
| 5,073,863 | 12/1991 | Zhang | 395/3 |
| 5,121,466 | 6/1992 | Zhang | 395/3 |
| 5,305,424 | 4/1994 | Ma et al. | 395/51 |
| 5,398,299 | 3/1995 | Ota et al. | 395/3 |
| 5,524,179 | 6/1996 | Kanda | 395/51 |
| 5,579,439 | 11/1996 | Khan | 395/11 |

*Primary Examiner*—David K. Moore
*Assistant Examiner*—Sanjiv Shah

[57] ABSTRACT

A minimum-maximum computation circuit (5) includes a circuit (10) for detecting an order of magnitude of the input label's grades and a circuit for executing a minimum-maximum calculation (41, 42, and 49) according to an order of the magnitude of the input label's grades. The minimum-maximum computation circuit includes a rule memory (20) for storing rule-associative-bit-groups which include a valid/invalid bit for each of the coded rules. Each of the coded rules include an arrangement of valid/invalid bits for indicating whether each of said input labels is included or not in the antecedent of said each of rules. The minimum-maximum computing circuit further includes a weighting factor circuit (63) for providing weighting factors in their magnitude order to be applied to selected fuzzy rules.

16 Claims, 14 Drawing Sheets

FIG. 7 — INPUT LABELS SORTOR

|  GRADE REGISTERS  | LABEL REGISTERS |
|---|---|
| F F | 0 0 0 |
| ⋮ | ⋮ |
| F F | 0 0 0 |
| F F | 0 0 0 |
| F F | 0 0 0 |
| F F (=8/8) | 1 F F |
| E 0 (=7/8) | 1 E 0 |
| C 0 (=6/8) | 1 C 0 |
| A 0 (=5/8) | 1 A 0 |
| 8 0 (=4/8) | 1 8 0 |
| 6 0 (=3/8) | 1 6 0 |
| 4 0 (=2/8) | 1 4 0 |
| 2 0 (=1/8) | 1 2 0 |
| 0 0 (=0/8) | 1 0 0 |

INITIAL VALUES FOR INPUT LABEL'S GRADES 16 STAGES

WEIGHTING FACTORS 9 STAGES

*FIG.9*

CODED RULE (1)

| A | B | C | D | E | F | G | H | I | J | K | L | M | N |
|---|---|---|---|---|---|---|---|---|---|---|---|---|---|
| 1 | 1 | 0 | 0 | 0 | 0 | 0 | 0 | 0 | 0 | 0 | 0 | 0 | 0 |

*FIG.11*

CODED RULE (5)

| A | B | C | D | E | F | G | H | I | J | K | L | M | N |
|---|---|---|---|---|---|---|---|---|---|---|---|---|---|
| 0 | 0 | 1 | 1 | 0 | 0 | 0 | 0 | 0 | 0 | 0 | 0 | 0 | 0 |

| INPUT LABELS | A | B | C | D | E | F | G | H | I | J | K | L | M | N | OUTPUT LABELS |
|---|---|---|---|---|---|---|---|---|---|---|---|---|---|---|---|
| INPUT LABEL'S CODES | a | b | c | d | e | f | g | h | i | j | k | l | m | n | |
| CODED RULES (7) | 0 | 0 | 0 | 0 | 0 | 0 | 0 | 0 | 0 | 1 | 1 | 1 | 0 | 0 | Z |
| (6) | 0 | 0 | 0 | 0 | 0 | 0 | 0 | 1 | 1 | 0 | 0 | 0 | 0 | 0 | Z |
| (5) | 0 | 0 | 1 | 1 | 0 | 0 | 0 | 0 | 0 | 0 | 0 | 0 | 0 | 0 | Z |
| (4) | 0 | 0 | 0 | 0 | 0 | 0 | 1 | 0 | 0 | 0 | 0 | 0 | 1 | 1 | Y |
| (3) | 0 | 0 | 0 | 0 | 1 | 1 | 0 | 0 | 0 | 0 | 0 | 0 | 0 | 0 | X |
| (2) | 0 | 1 | 1 | 0 | 0 | 0 | 0 | 0 | 0 | 0 | 0 | 0 | 0 | 0 | X |
| (1) | 1 | 1 | 0 | 0 | 0 | 0 | 0 | 0 | 0 | 0 | 0 | 0 | 0 | 0 | X |

RULE-ASSOCIATIVE-BIT-GROUP (column A)

FIG.14

DATA PROCESSOR FOR PERFORMING A FUZZY LOGIC WEIGHTING FUNCTION AND METHOD THEREFOR

FIELD OF THE INVENTION

This invention relates generally to a fuzzy logic circuit in a data processor, and more particularly to a circuit for calculating a fuzzy logic weighting function in the data processor.

BACKGROUND OF THE INVENTION

Data processors have been developed to function as binary machines whose inputs and outputs are either interpreted as ones or zeroes, and no other possibilities may exist. While this works well in most situations, sometimes an answer is not simply "yes" or "no," but something in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, given two membership functions over a range of temperatures, an input temperature may fall in the overlapping areas of both the functions labeled "cool" and "warm." Further processing would then be required to determine a degree of membership in each of the membership functions (i.e. if the input temperature fits into each of the membership sets, cool and warm).

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception which is not generally limited to an environment of absolute truths. After the fuzzification step, a rule evaluation step is executed. During execution of the rule evaluation step, a technique referred to as "min-max" inference is used to calculate numerical conclusions to linguistic rules defined by a user. Conclusions from the rule evaluation step are referred to as "fuzzy outputs" and may be true to varying degrees. Thus, competing results may be produced. A last step in the fuzzy logic process is referred to as "defuzzification." As the name implies, defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article was published in the April, 1992 issue of AI EXPERT on pages 25 through 31.

As technology has grown, data processors have been developed to provide fuzzy logic control based on fuzzy inference for controlling various consumer electronic products, household appliances, automobiles and other electronically controlled products. In a typical system which has multiple fuzzy inference inputs, degrees of conformity (grades) between each of a plurality of fuzzy concepts included in an antecedent of a fuzzy rule and facts indicated by the data actually input are calculated first. Labels are provided for each of a plurality of fuzzy concepts that are defined in the antecedent of the fuzzy rule to distinguish the antecedents from each other. For this reason, each of the fuzzy concepts is also referred to as an input label. A min-max calculation corresponding to the fuzzy rule is performed using a plurality of calculated grades of input labels to generate a plurality of grades for each of a plurality of output labels. The plurality of output labels are subsequently used to determine cross points between a membership function of the plurality of fuzzy concepts (output labels) included in consequent of the fuzzy rule and the actual value input. Finally, a defuzzification operation is performed for producing definite output from center of gravity of the cross points.

A min-max computation on a plurality of input label grades will be explained using the following illustrative example which includes seven fuzzy rules.

| Rule (1) | if A and B | then X |
|---|---|---|
| Rule (2) | if B and C | then X |
| Rule (3) | if E and F | then X |
| Rule (4) | if G and M and N | then X |
| Rule (5) | if C and D | then Y |
| Rule (6) | if H and I | then Z |
| Rule (7) | if J and K and L | then Z |

The antecedents of these rules include input labels A through N and the consequents include output labels X through Z. Assume that grades Ag through Ng of the input labels A through N have the following values:

Ag=0;
Bg=0.06;
Cg=07;
Dg=0.55;
Eg=0.65;
Fg=0;
Gg=0.45;
Hg=0.9;
Ig=0;
Jg=0;
Kg=0;
Lg=0.62;
Mg=0.2;
Ng=0.

First, a minimum computation is performed on each fuzzy rule to detect a minimum grade among the plurality of grades of each of the input labels for each fuzzy rule. For example, the antecedent of rule (1) includes input labels A and B which have respective grades of Ag=0 and Bg=0.06. Subsequently, Ag (=0) is selected as the minimum grade since Ag is smaller than Bg. Similarly, rule (2) selects grade Bg (=0.06) of input label B and rule (3) selects grade Fg (=0) of input label F. Additionally, rule (4) selects grade Ng (=0) as the minimum value.

Then, a maximum computation is performed for each of the plurality of output labels to detect a maximum grade among the previously detected minimum grades of the fuzzy rules which have a same output label as their consequents. For example, rules 1,2,3, and 4 all have a same output label X. Therefore, grade Bg (=0.06) is selected as a maximum grade among minimum grades Ag,Bg,Fg and Ng. Similar maximum computations are performed for other output labels Y and Z. Grade Dg (=0.55) is selected as the maximum for output label Y and Ig=Jg=Kg (=0) are selected as the maximum for output label Z.

In the fuzzy inference system mentioned above, multiple input channels are provided to receive multiple input data values such as velocity, pressure and temperature. As well, multiple input labels are defined in each of the input channels. The fuzzy inference system also has multiple output channels to produce multiple output data such as an on/off switch signal and valve control signal. Furthermore, multiple output labels are also defined in each of the output channels. Therefore, a total number of the input label grades, each of which requires fuzzy minimum and maximum computation, is equal to a number of input channels times a number of input labels per input channel. This results in a significant number of calculations for this fuzzy inference system.

Prior art implementations of fuzzy control systems have been used mainly in low speed control applications such as home appliances. However, when fuzzy control systems are desired for use in high speed and relatively complicated control applications such as automobile cruise control or suspension control, computing speed must be improved to a thousand times faster than a conventional fuzzy control system. The improvement of the computation speed is achieved by synergistically tuning three computation stages: the grade calculations of input labels, the min-max operations performed on the input label grades to obtain output label grades, and the calculations of center of gravity of output label's membership functions.

Conventional fuzzy control systems incorporate minimum operations on input label grades by comparing each of input label grades with all other input label grades one by one. A typical example of such a comparison operation is illustrated in Japanese patent laid-open 4-10133 describing a comparison achieved by software program. However, comparisons by software programs are unable to significantly improve their computing speed because a large number of magnitude comparisons are typically required. Another typical example of a comparison operation achieved by hardware is Japanese patent laid-open 2-159628. This hardware solution also has difficulty in improving its execution speed because a large number of comparison circuits are required for respective input labels. In hardware solutions, manufacturing cost reduction is also difficult to achieve.

In a typical fuzzy inference system which has a plurality of input channels and a plurality of input labels, most of a plurality of corresponding input label grades equal zero. For example, if every membership function intersects only two neighboring functions in each of the plurality of input channels, then a maximum of two non-zero grades are output from each input channel. Therefore, seventy to eighty percent of the plurality of input label grades for which the minimum-maximum operation is performed are equal to zero. Therefore, the zero grade is provided for most of the plurality of input labels which require a significant amount of time to process in the minimum-maximum operation, but each of the input labels having zero grades do not contribute to the results of the minimum-maximum operations. However, in prior art minimum-maximum operations, the input labels having zero grades are processed in a same manner as input labels having non-zero grades. Thus, many redundant operations are executed by the fuzzy inference system resulting in slow operation speed, large hardware size, and substantial overhead costs.

Because of such disadvantages, prior art implementations of fuzzy inference systems have found it necessary to either remove some of the fuzzy rules from the system or reduce an effect of some of fuzzy rules on the system to improve performance of the fuzzy inference system. A reduction in the effect of some of the fuzzy rules on the system may be performed by multiplying a plurality of weighting factors to a result of the minimum-maximum computation. Note that the weighting factors range from zero to a value smaller than unity. While the weighting factors provide one solution, a logic circuit required for multiplying the result of the minimum-maximum computation by the weighting factors is complex and will significantly increase the overhead costs associated with implementing the fuzzy inference system.

Therefore, a need exists for a minimum-maximum computation circuit for fuzzy inference in which computation speed is increased and an amount of hardware is reduced. This need is especially relevant when weighting factors are applied to each of the plurality of fuzzy rules.

SUMMARY OF THE INVENTION

The previously mentioned needs are fulfilled with the present invention. Accordingly, there is provided, in a first form, a fuzzy inference system including a plurality of fuzzy rules having input labels as antecedents and output labels as consequents and a minimum-maximum computing circuit. The minimum-maximum computing circuit executes a minimum-maximum operation on the input label's grades. The minimum-maximum computing circuit includes a rule memory for storing rule- associative-bit-groups in memory areas addressed by label codes for discriminating the input labels from each other. The rule-associative-bit-groups include a valid/invalid bit for each bit position in each of the coded rules. Each coded rule consists of an arrangement of valid/invalid bits. The valid/invalid bits are arranged in a predetermined order. Each valid/invalid bit indicates whether a corresponding input label is included in the antecedent of the rule. An input label's sorting circuit sorts the input label's grades and correlated label codes according to the order of magnitude of said input label's grades. The input label's sorting circuit provides the sorted input label's grades in their magnitude order. The input label sorting circuit simultaneously outputs the correlated label codes to be provided to address input terminals of the rule memory to cause reading out of said rule-associative-bit-groups. The rule-associated-bit groups comprise each of the coded rules and may be read out successively. A weighting factor outputting circuit is also provided for outputting weighting factors in their magnitude order to be applied to some of said fuzzy rules. A weighting factor-associative-bit-groups generating circuit stores the weighting factors to be applied to each of the rules. The steps of generating weighting factor-associated-bit-groups includes arranging valid/invalid bits for indicate whether each of the stored weighting factors is equal or not to said weighting factors generated by said weighting factor generating circuit. A selecting circuit compares each of the input label's grades being output from the input label sorting circuit and each of the weighting factors being output from the weighting factor output circuit to select one of the rule-associative-bit-groups which is output from the rule memory and the weighting factors-associative-bit-groups being output from the weighting factor-associative-bit-groups generating circuit according to the result of the comparison. The selecting circuit also selects one of the input label's grades being output from the label sorting circuit and weighting factor being output from the weighting factor output circuit according to a result of the comparison. A minimum-maximum detecting circuit is arranged for each of the output labels for detecting minimum-maximum values for each of the output labels. The minimum-maximum detecting circuit first detecting information about the minimum values among the input label's grades and weighting factors being selected by the selecting circuit. The detection of information being carried out for each of the rules included in each of the output labels according to the valid bit appearing first or last in each of the coded rules. The minimum-maximum detecting circuit then detects the maximum value among the minimum values included in each of the output labels according to the detected information about the minimum values.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWING

FIG. 9 illustrates in tabular form a chart providing an example of initial values set in each of the plurality of cascaded grade registers and label registers of FIG. 8;

FIG. 11 illustrates in tabular form a chart which describes a concept of a coded rule in accordance with the present invention;

FIG. 12 illustrates in tabular form a chart which describes a concept of a coded rule in accordance with the present invention;

FIG. 13 illustrates in tabular form a chart which describes a concept of rule-associative-bit-groups being stored in a rule memory in accordance with the present invention;

FIG. 14 illustrates in tabular form a chart which illustrates a concept of rule-associative-bit-groups being rearranged in an order of magnitude of input labels' grades in accordance with the present invention.

DETAILED DESCRIPTION OF A PREFERRED EMBODIMENT

Figure 1:
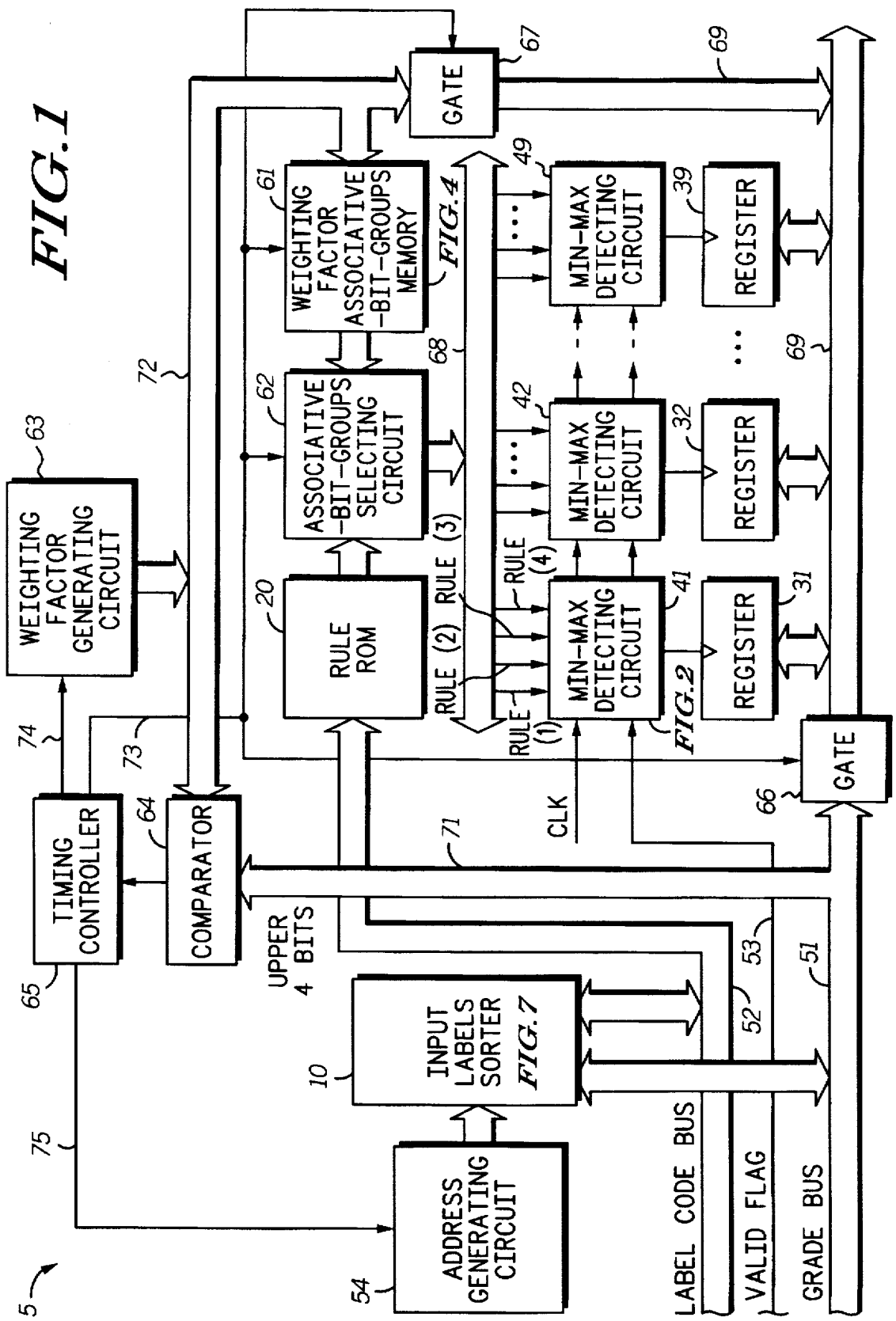
FIG. 1 illustrates in block diagram form a data processor in accordance with the present invention.

The present invention provides a data processor having a fuzzy inference circuit which performs minimum-maximum computations quickly and efficiently, while optimizing overhead costs. The fuzzy inference system includes a circuit for detecting an order of a plurality of input labels' grades based on magnitude. Additionally, the fuzzy inference system includes a circuit for executing a minimum-maximum calculation in response to an order of the magnitude of the input labels' grades. More specifically, the minimum-maximum computation circuit includes a rule memory for storing rule-associative-bit-groups in memory areas addressed by an address code corresponding to each of the plurality of input labels codes. The address code distinguishes each of the plurality of input labels from one other. Furthermore, each of the rule-associative-bit-groups includes a valid bit in each of the coded fuzzy rules used in the fuzzy inference system. Furthermore, each of the coded rules includes an arrangement of valid bits for indicating whether each of the input labels is included or not in an antecedent of each of the fuzzy inference rules.

The minimum-maximum computation circuit of the data processor also includes an input label sorting circuit for sorting the input labels' grades. The input label sorting circuit also correlates each of a plurality of input label codes to one of the plurality of input label grades according to a magnitude order of the plurality of input label grades. The input label sorting circuit outputs each of the sorted input labels' grades in their magnitude order. Additionally, the input label sorting circuit simultaneously outputs each of the plurality of correlated input labels' codes to the address input terminal of a rule memory such that rule-associative-bit-groups which comprise coded rules may be successively read out.

As well, the minimum-maximum computing circuit of the present invention includes a weighting factor outputting circuit for providing a plurality of weighting factors in an order based on magnitude. The minimum-maximum computing circuit provides each of the plurality of weighting factors to be applied to a portion of the plurality of fuzzy rules. A weighting factor-associative-bit-groups generating circuit is also provided for storing the plurality of weighting factors to be applied to each of the plurality of fuzzy rules. Additionally, the weighting factor-associative-bit groups include an arrangement of valid bits which indicate whether each of the stored weighting factors is equal to the weighting factors generated by the weighting factor generating circuit. The minimum-maximum computing circuit also includes a selecting circuit for comparing each of the plurality of input labels' grades being output from the input label sorting circuit and each of the weighting factors being output from the weighting factor output circuit. The selecting circuit later selects either one of the rule-associative-bit-groups which is output from the rule memory or one of the weighting factor-associative-bit-groups being output from the weighting factor-associative-bit-groups generating circuit. In response to the comparison operation, the selecting circuit also selects one of either the plurality of input labels' grades being output from the input labels storing circuit or one of the plurality of weighting factors being output from the weighting factor output circuit.

Furthermore, the minimum-maximum computing circuit of the present invention includes a minimum-maximum detecting circuit which is coupled to receive a plurality of output labels and determine one of a minimum and a maximum value. The minimum-maximum detecting circuit first detects information about the minimum values among the plurality of input labels' grades and weighting factors that are selected by the selecting circuit. The minimum value is detected using information provided by each of the fuzzy rules. The fuzzy rules are included in the plurality of output labels that are provided according to a logic level of a valid bit appearing first or last in each of coded fuzzy rules. the minimum-maximum detecting circuit then detects the maximum value among the minimum values included in each of the output labels according to the detected information about the minimum values.

The data processor and method for executing a fuzzy logic operation will subsequently be described in greater detail.

Description of Connectivity

FIG. 1 illustrates a data processing system 5. Data processing system 5 includes an input label sorter 10, a rule ROM (Read Only Memory) 20, a series of registers including registers 31, and 32–39, a series of min-max (minimum-maximum) detecting circuits including a min-max detecting circuit 41, and 42–49, an address generating circuit 54, a weighting factor associative-bit-groups memory 61, an associative-bit-groups selecting circuit 62, a weighting factor generating circuit 63, a comparator 64, a timing controller 65, a gate 66, and a gate 67.

A Grade bus 51 is coupled to gate 66 and comparator 64. An output of gate 66 is coupled to each of register 31, and 32–39, and gate 67. Comparator 64 is coupled to timing controller 65. A first output of timing controller 65 (labeled 75) is coupled to address generating circuit 54. A second output of timing controller 65 (labeled 74) is coupled to weighting factor generating circuit 63. A third output of timing controller 65 (labeled 73) is coupled to gate 66, associative-bit-groups selecting circuit 62, weighting factor associative-bit-groups memory 61 and gate 67. Weighting factor generating circuit 63 is coupled to comparator 64, weighting factor associative-bit-groups memory 61 and gate 67 via a bus 72.

An output of associative-bit-groups selecting circuit 62 is coupled to a bus 68. Bus 68 is coupled to each of min-max detecting circuits 41, and 42–49. A CLK (Clock) signal is provided to a first input of min-max detecting circuit 41 and a Valid Flag signal is provided to a second input of min-max detecting circuit 41. Register 31 is coupled to min-max detecting circuit 41. Similarly, register 32 and register 39 are coupled to min-max detecting circuits 42 and 49, respectively. Registers 31, 32–39 are bidirectionally coupled to gate 66 via Bus 69. A Grade Bus 51 provides grade data to input labels sorter 10, gate 66, and comparator 64. A Label Code Bus 52 is coupled to both input labels sorter 10 and rule ROM 20. Additionally, address generating circuit 54 provides address information to input labels sorter 10.

Figure 2:
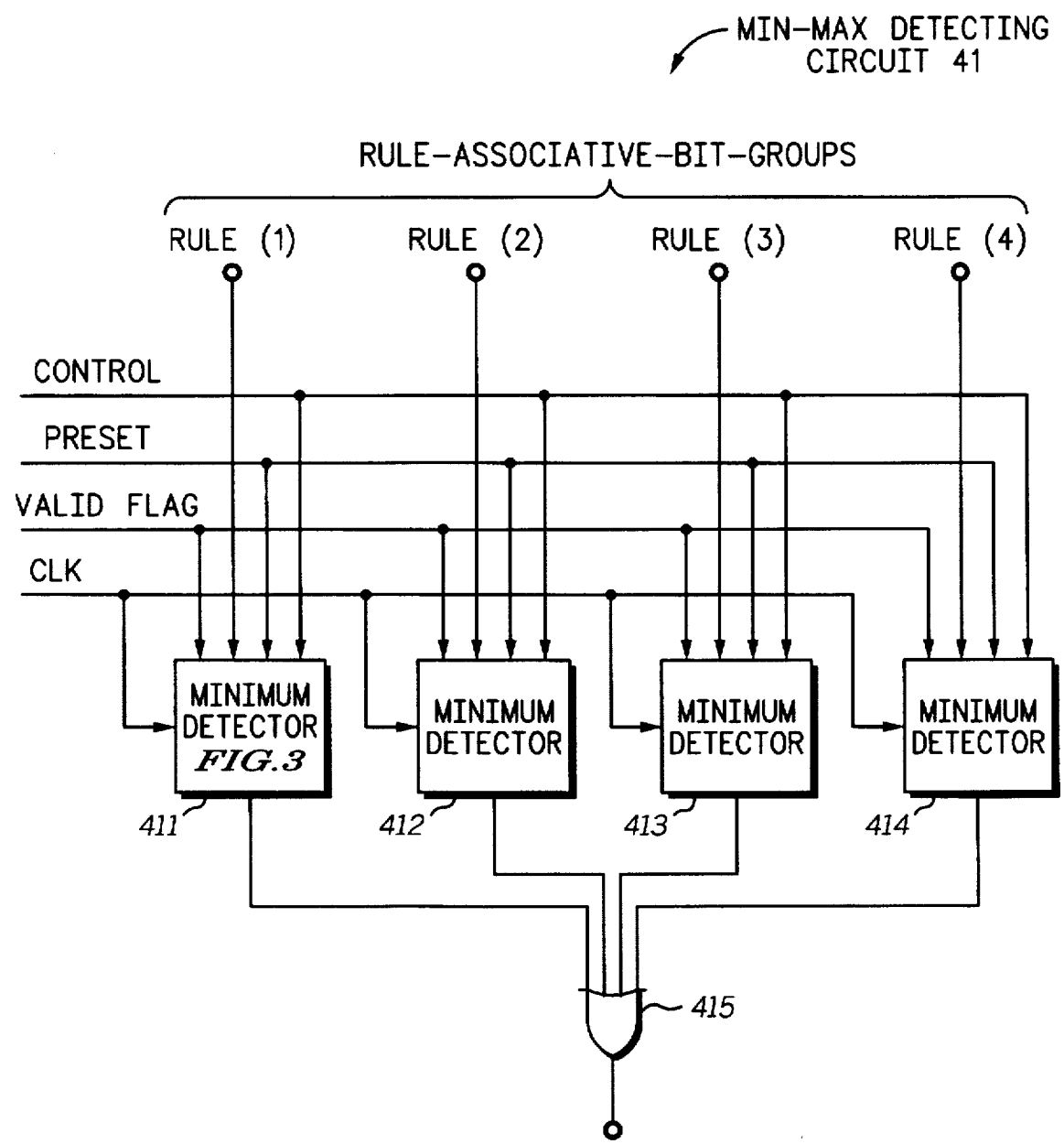
FIG. 2 illustrates in block diagram form a minimum-maximum detecting circuit of the data processor of FIG. 1.

FIG. 2 illustrates min-max detecting circuit 41. Min-max detecting circuits 42–49 are implemented in a similar manner. Min-max detecting circuit 41 includes a minimum detector 411, a minimum detector 412, a minimum detector 413, a minimum detector 414, and an OR gate 415. The Preset, CLK (Clock) and Valid Flag signals are provided to each of minimum detector 411, minimum detector 412, minimum detector 413, and minimum detector 414. Additionally, a plurality of Control signals are provided to each of minimum detector 411, minimum detector 412, minimum detector 413, and minimum detector 414. A Rule (1) value is provided to minimum detector 411 via Bus 68. Similarly, a Rule (2) value is provided to minimum detector 412 via Bus 68. A Rule (3) value is also provided to minimum detector 413 and a Rule (4) value is also provided to minimum detector 414 via Bus 68. Each of minimum detectors 411 through 414 are provided to OR gate 415. OR gate 415 provides a minimum value to register 31.

Figure 3:
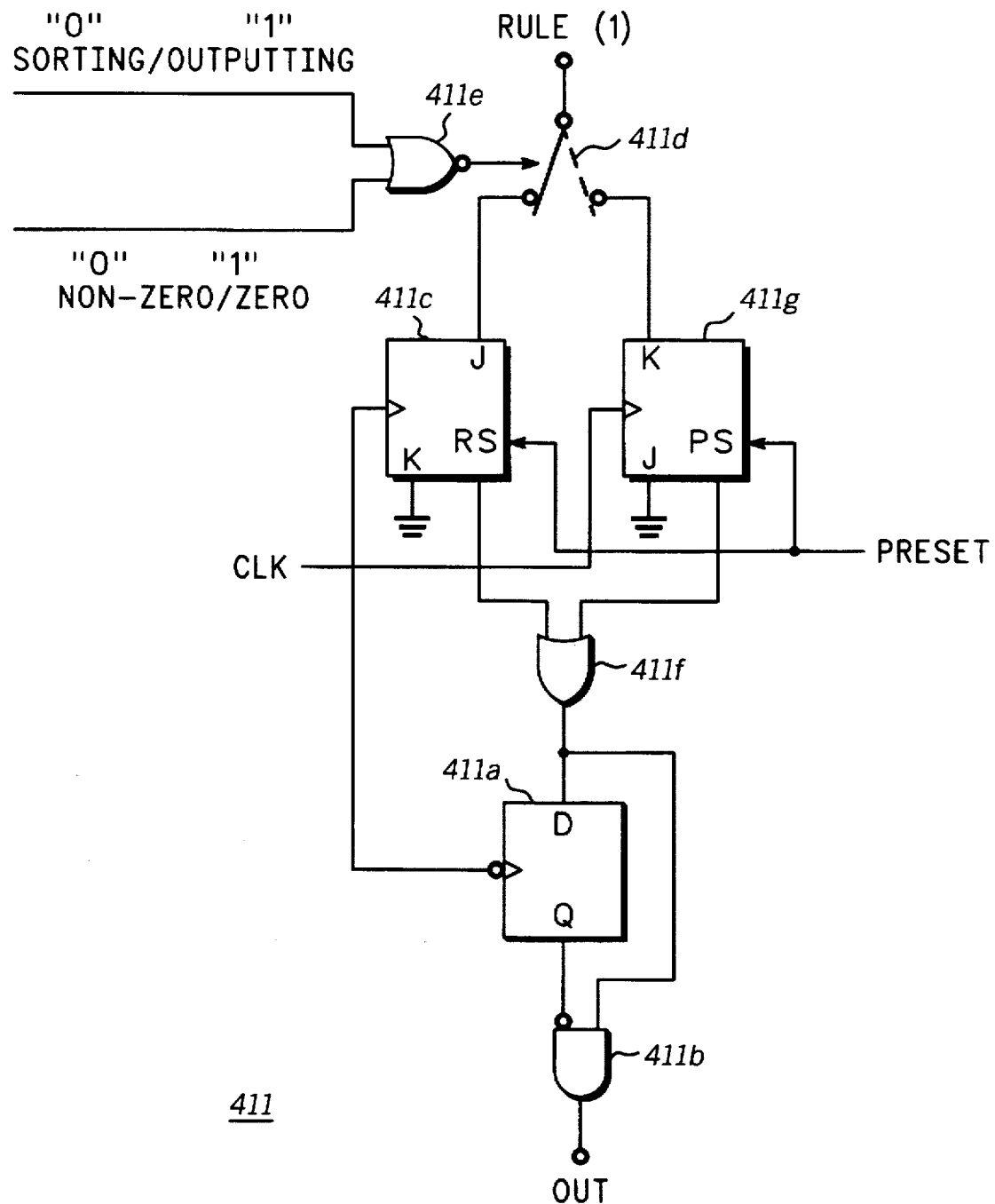
FIG. 3 illustrates in block diagram form a minimum detector circuit of the minimum-maximum circuit of FIG. 2.

FIG. 3 illustrates minimum detector 411 in more detail. Minimum detectors 412, 413, and 414 are implemented in a manner similar to minimum detector 411 as illustrated in FIG. 3. Minimum detector 411 includes a NOR gate 411e, a switch 411d, a latch 411c, a latch 411g, an OR gate 411f, a latch 411a, and an AND gate 411b. The plurality of Control signals provides a Sorting/Outputting signal to a first input of NOR gate 411e. Additionally, the plurality of Control signals provides a Non-Zero/Zero signal to a second input of NOR gate 411e. An output of NOR gate 411e is provided to switch 411d. The Rule (1) signal is provided to switch 411d. Switch 411d selectively provides a J input to latch 411c. Switch 411d selectively provides a K input to latch 411g. The CLK signal provides a clock input to each of latch 411c, latch 411g, and latch 411a. The Preset signal provides a PS input to latch 411g and a RS input to latch 411c. Latch 411c provides a first input to OR gate 411f. Latch 411g provides a second input to OR gate 411f. OR gate 411f provides a D input to latch 411a and a first input of AND gate 411b. Latch 411a provides a Q output to AND gate 411b. AND gate 411b inverts the Q output. AND gate 411b provides an Out signal.

Figure 4:
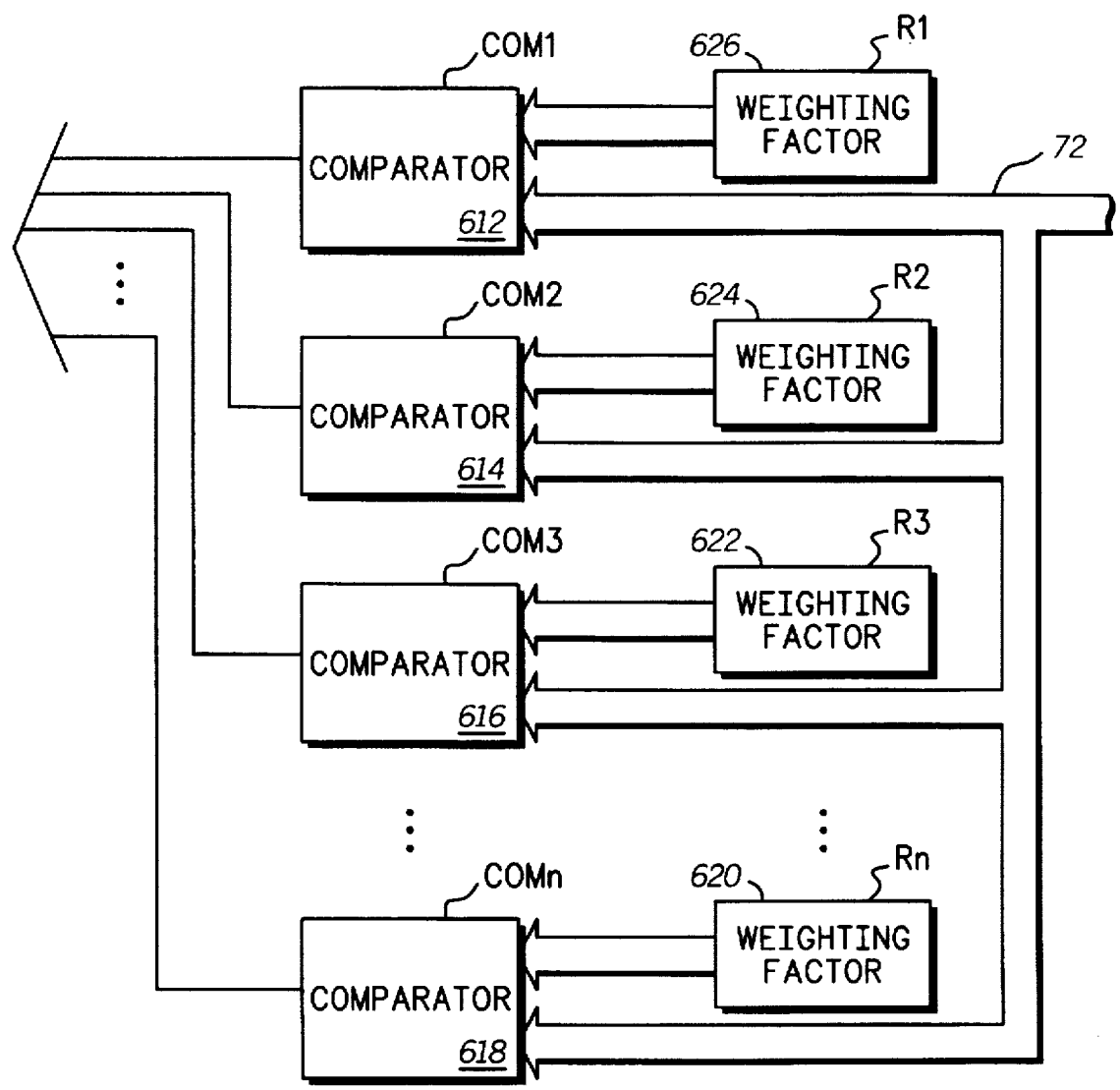
FIG. 4 illustrates in block diagram form a weighting factor-associative-bit-groups memory of the data processor of FIG. 1.

FIG. 4 illustrates weighting factor associative-bit-groups memory 61 in more detail. Weighting factor associative-bit-groups memory 61 includes a series of comparators 612,614, and 616–618, and a series of weighting factors 626, 624, 622 and 620. Weighting factor 626 provides a first input (R1) and bus 72 provides a second input to comparator 612. Weighting factor 624 provides a first input (R2) and bus 72 provides a second input to comparator 614. Weighting factor 622 provides a first input (R3) and bus 72 provides a second input to comparator 616. Weighting factor 620 provides a first input (Rn) and bus 72 provides a second input to comparator 618. An output of comparators 612, 614, 616, and 618 provide outputs to associative-bit-groups selecting circuit 62.

Figure 5:
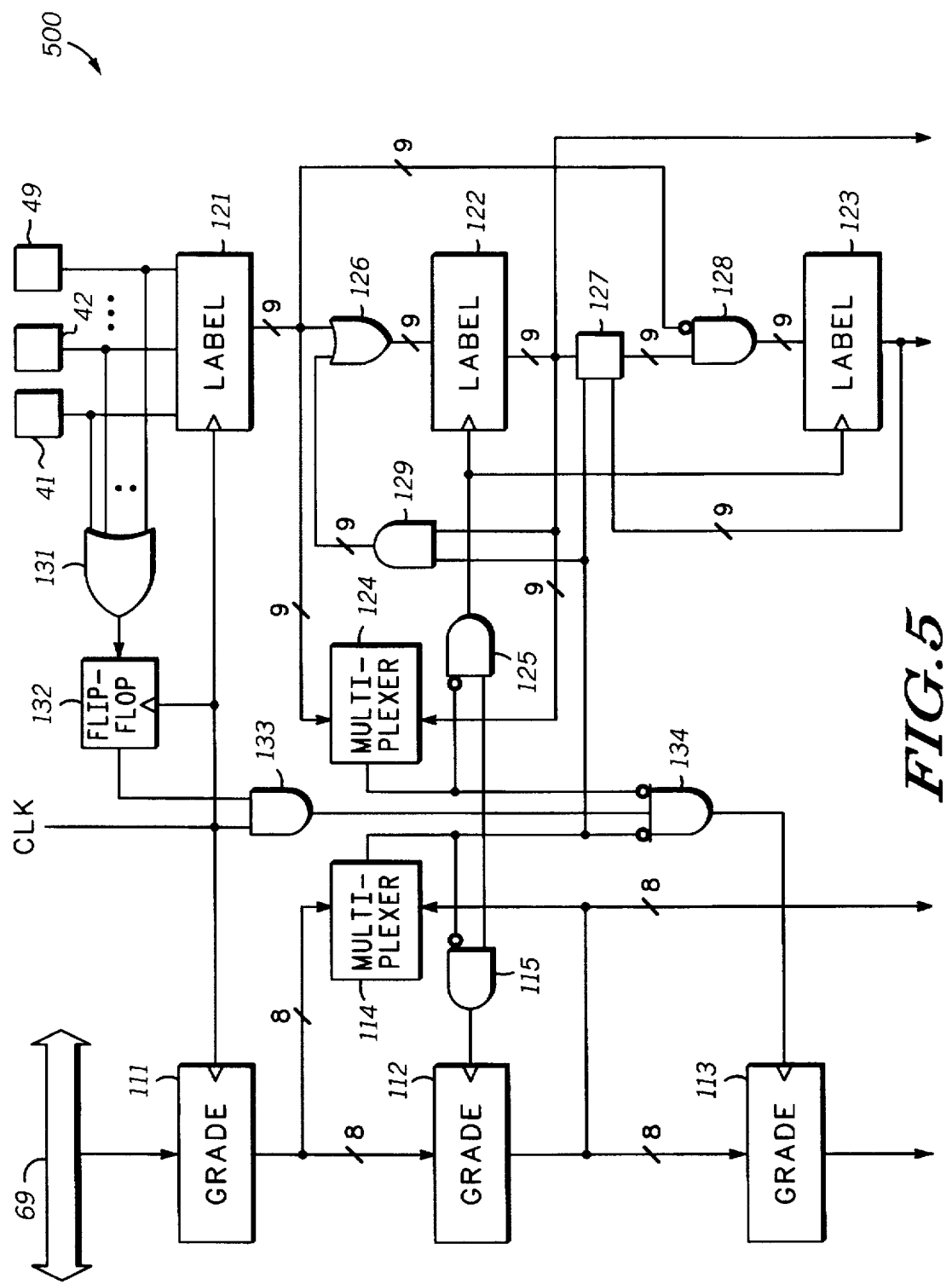
FIG. 5 illustrates in block diagram form a second embodiment of a data processor in accordance with the present invention.

FIG. 5 illustrates an alternate embodiment of the present invention. FIG. 5 illustrates a data processing system 500. Data processing system 500 includes a series of min-max detecting circuits 41, and 42–49, a grade register 111, a grade register 112, a grade register 113, a multiplexer 114, an AND gate 115, a label register 121, a label register 122, a label register 123, an AND gate 125, an OR gate 126, a latch 127, an AND gate 128, an AND gate 129, an OR gate 131, a flip-flop 132, an AND gate 133, and an AND gate 134.

Bus 69 provides grade data to grade register 111. Grade register 111 provides grade data to grade register 112 and multiplexer 114. Grade register 112 provides grade data to grade register 113 and multiplexer 114. Multiplexer 114 provides an input to AND gate 134, latch 127, AND gate 129, and AND gate 115. The CLK signal is provided to grade register 111, AND gate 133, flip-flop 132, and label register 121. Flip-flop 132 provides an input to AND gate 133. An output of AND gate 133 provides an input to AND gate 134, AND gate 115, and AND gate 125. Outputs of each of min-max detecting circuits 41, and 42–49 are provided to both OR gate 131 and label register 121. OR gate 131 provides an input to flip-flop 132. Label register 121 provides latch data to OR gate 126, multiplexer 124, and AND gate 128. An output of OR gate 126 is provided to label register 122. Label register 122 provides an input to latch 127, AND gate 129, and multiplexer 124. An output of AND gate 129 is provided to an input of OR gate 126. An output of latch 127 is provided to AND gate 128. An output of AND gate 128 is provided to label register 123. An output of label register 123 provides an input to latch 127. Multiplexer 124 provides an input to AND gate 134 and AND gate 125. An output of AND gate 134 is provided to grade register 113. An output of AND gate 125 is provided to each of label register 122 and label register 123.

Figure 6:
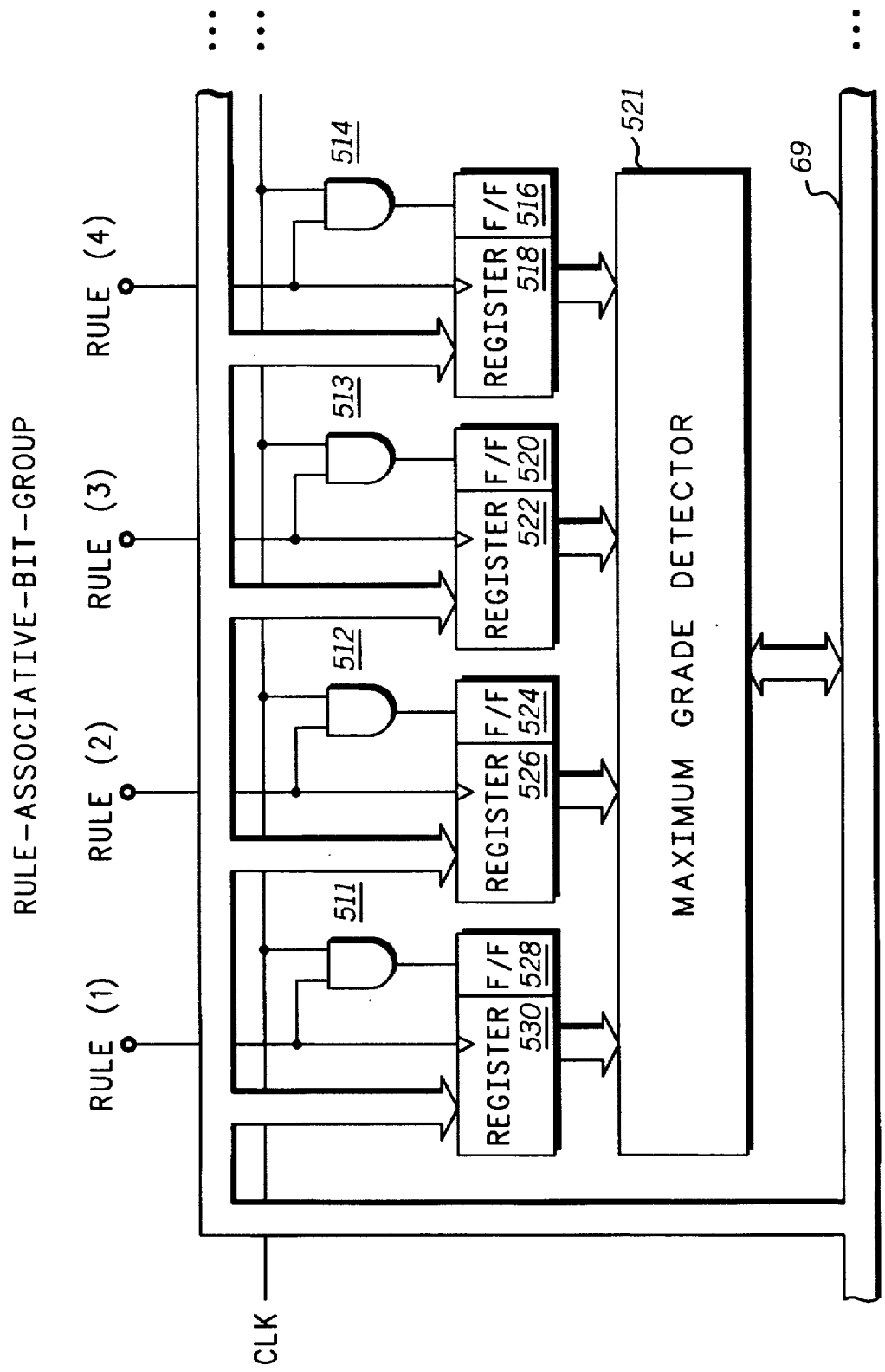
FIG. 6 illustrates in block diagram form a second embodiment of a minimum-maximum circuit of the data processor of FIG. 1.

FIG. 6 illustrates a second embodiment of a min-max detecting circuit. The second embodiment comprises an AND gate 511, an AND gate 512, an AND gate 513, an AND gate 514, a register 518, a flip-flop 516, a register 522, a flip-flop 520, a register 526, a flip-flop 524, a register 530, a flip-flop 528, and a maximum grade detector 521. The CLK signal is provided to an input of each of AND gates 511 through 514. Bus 69 is bidirectionally coupled to maximum grade detector 521 and provides data to each of registers 518, 522, 526, and 530. A Rule (1) signal is provided to an input of AND gate 511 and register 530. An output of AND gate 511 is provided to flip-flop 528. Register 530 is coupled to maximum grade detector 521. A Rule (2) signal is provided to an input of AND gate 512 and register 526. An output of AND gate 512 is provided to flip-flop 524. Register 526 is coupled to maximum grade detector 521. A Rule (3) signal is provided to an input of AND gate 513 and register 522. An output of AND gate 513 is provided to flip-flop 520. Register 522 is coupled to maximum grade detector 521. A Rule (4) signal is provided to an input of AND gate 514 and register 518. An output of AND gate 514 is provided to flip-flop 516. Register 518 is coupled to maximum grade detector 521.

Figure 7:
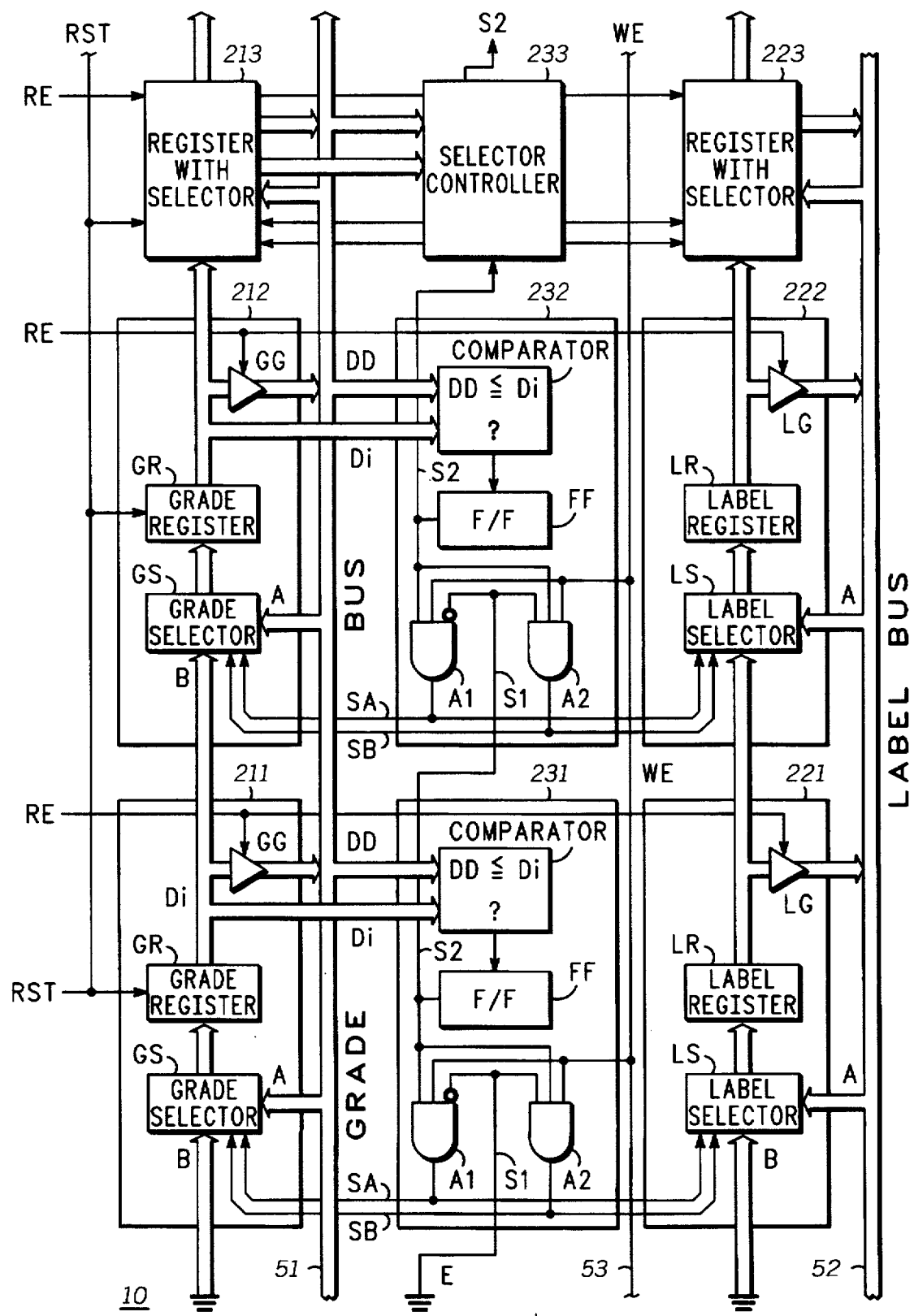
FIG. 7 illustrates in block diagram form an input label sorter of the data processor of FIG. 1.

FIG. 7 illustrates input labels sorter 10 in greater detail. Input labels sorter 10 includes a plurality of grade registers 211, 212, and 213, a plurality of label registers 221, 222, and 223, and a plurality of selector controllers 231, 232, and 233. Each of the plurality of grade registers 211, 212, and 213 includes a grade selector (GS), a grade register (GR), and a buffer (GG). Each of the plurality of label registers includes a label selector (LS), a label register (LR), and a buffer (LG). Each of the plurality of selector controllers 231,232, and 233 includes an AND gate (A1), an AND gate (A2), a flip-flop (FF), and a comparator.

A reset (RST) signal is provided to a grade register (GR) of each of the plurality of grade registers 211, 212, and 213. A readenable (RE) signal is provided to a buffer (GG) of each of the plurality of grade registers 211, 212, and 213. Grade bus 51 provides grade information to a grade selector of each of the plurality of grade registers 211, 212, and 213. A selection code (SA) signal and a selection code (SB) signal are provided to the grade selector of each of the plurality of grade registers 211, 212, and 213. In each of the plurality of grade registers 211, 212, and 213, the grade selector (GS) provides information to the grade register (GR). An output of the grade register (GR) provides an output to buffer (GG) and to a comparator in an associated one of the plurality of selector controllers 231, 232, and 233. The output of the grade register (GR) is also provided to a grade selector of a next one of the plurality of grade registers.

In each of the plurality of selector controllers 231, 232, and 233, the comparator receives grade information provided by Grade Bus 51. An output of the comparator is provided to the flip-flop. An output of the flip-flop is provided to an input of each of the AND gates, A1 and A2. The output (S2) of the flip-flop is also provided to each of the AND gates, A1 and A2, of a next one of the plurality of selector controllers. A Write Enable (WE) signal provided by the Valid Flag signal is provided to an input of each of the AND gates, A1 and A2, of each of the plurality of selector controllers 231, 232, and 233. In a first one of the plurality of selector controllers 231, an input (S1) to AND gates A1 and A2 is coupled to a reference voltage value (E).

A RE signal is provided to a buffer (LG) of each of the plurality of label registers 221, 222, and 223. Label bus 52 provides label information to a label selector of each of the plurality of label registers 221, 222, and 223. The SA signal and the SB signal are provided to the label selector of each of the plurality of label registers 221, 222, and 223. In each of the plurality of label registers 221, 222, and 223, the label selector (LS) provides information to the label register (LR). An output of the label register (LR) provides an output to buffer (LG). The output of the label register (LR) is also provided to a label selector of a next one of the plurality of label registers. The buffer (LG) provides the information to Label Bus 52.

Figure 8:
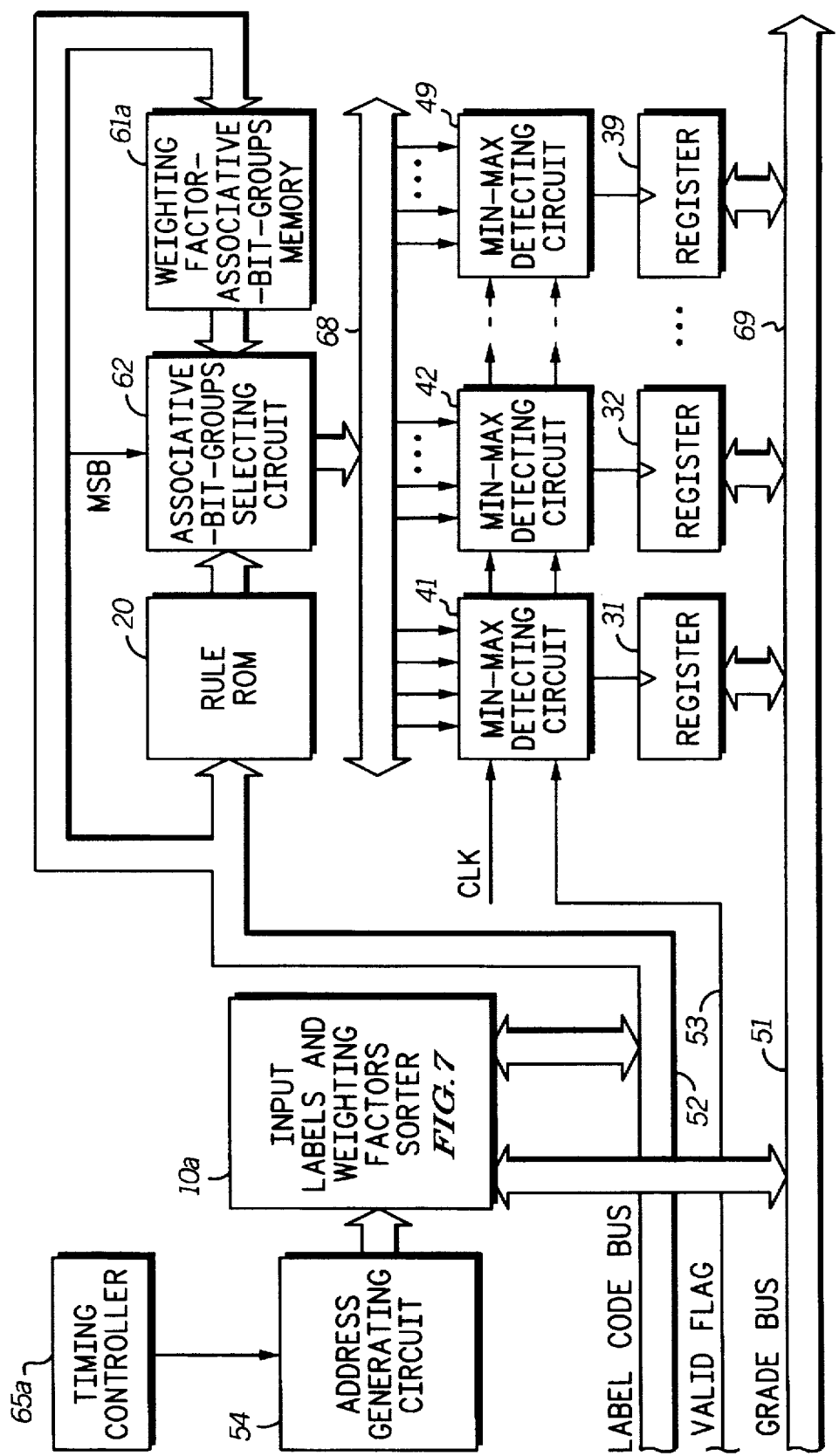
FIG. 8 illustrates in block diagram form a third embodiment of a data processor in accordance with the present invention.

FIG. 8 illustrates a third embodiment of data processing system 5. Data processing system 5 includes an input labels and weighting factors sorter 10a, a rule ROM (Read Only Memory) 20, a series of registers 31, and 32–39, a series of min-max detecting circuits 41, and 42–49, an address generating circuit 54, a weighting factor associative-bit-groups memory 61a, an associative-bit-groups selecting circuit 62, and a timing controller 65a.

A Grade bus 51 is coupled to input labels and weighting factors sorter 10a and is coupled to each of register 31, and 32–39. An output of timing controller 65a is coupled to address generating circuit 54. Address generating circuit 54 is coupled to input labels and weighting factors sorter 10a. Additionally, Input labels and weighting factors sorter 10a is bidirectionally coupled to Label Code bus 52. Label Code bus 52 is also coupled to rule ROM 20 and weighting factor-associative-bit-groups memory 61a. Label Code bus 52 provides a MSB (Most Significant Bit) input to associative-bit-groups selecting circuit 62. Both Rule ROM 20 and weighting factor-associative-bit-groups memory 61a are coupled to associative-bit-groups selecting circuit 62.

An output of associative-bit-groups selecting circuit 62 is coupled to a bus 68. Bus 68 is coupled to each of min-max detecting circuit 41, and 42–49. A CLK (Clock) signal is provided to a first input of min-max detecting circuit 41 and a Valid Flag signal is provided to a second input of min-max detecting circuit 41. Register 31 is bidirectionally coupled to min-max detecting circuit 41. Similarly, register 32–39 are bidirectionally coupled to min-max detecting circuits 42–49, respectively. Registers 31, 32–39 are bidirectionally coupled to gate 66 (of FIG. 1) via Bus 69.

Description of Operation of the Present Invention

Assume in the present invention that the seven fuzzy rules provided below are evaluated in the data processing system of FIG. 1. The Rules and the grades of each of the antecedents are provided below.

| Rule (1) | if A and B | then X |
| Rule (2) | if B and C | then X |
| Rule (3) | if E and F | then X |
| Rule (4) | if G and M and N | then X |
| Rule (5) | if C and D | then Y |
| Rule (6) | if H and I | then Z |
| Rule (7) | if J and K and L | then Z |

The antecedents of these rules include input labels A through N and the consequents include output labels X through Z. Assume that grades Ag through Ng of the input labels A through N have the following values:

Ag=0;
Bg=0.06;
Cg=0.7;
Dg=0.55;
Eg=0.65;
Fg=0;
Gg=0.45;

Hg=0.9;
Ig=0;
Jg=0;
Kg=0;
Lg=0.62;
Mg=0.2;
Ng=0.

In the present invention, an input label sorter sorts input labels in a magnitude order based on their respective grades. For example, input labels A through N, which are included in the seven rules illustrated above and may have been alphabetically arranged originally, can be rearranged or sorted in an order based on a magnitude of each of their grades. This arrangement is illustrated in FIG. 10.

After the input labels are sorted according to the order of the magnitude of each of their grades, an input label at a position farthest to the right in each rule is a minimum grade for that rule. Each of the minimum grades are indicated with a circle in FIG. 10. Among the marked minimum labels relevant to a same output label, an input label at a position farthest to the left has a maximum grade. The maximum grade for each rule is marked with double circles. In this manner, the input label sorter sorts the grades of each of the rules to facilitate a minimum-maximum computation.

Figure 10:
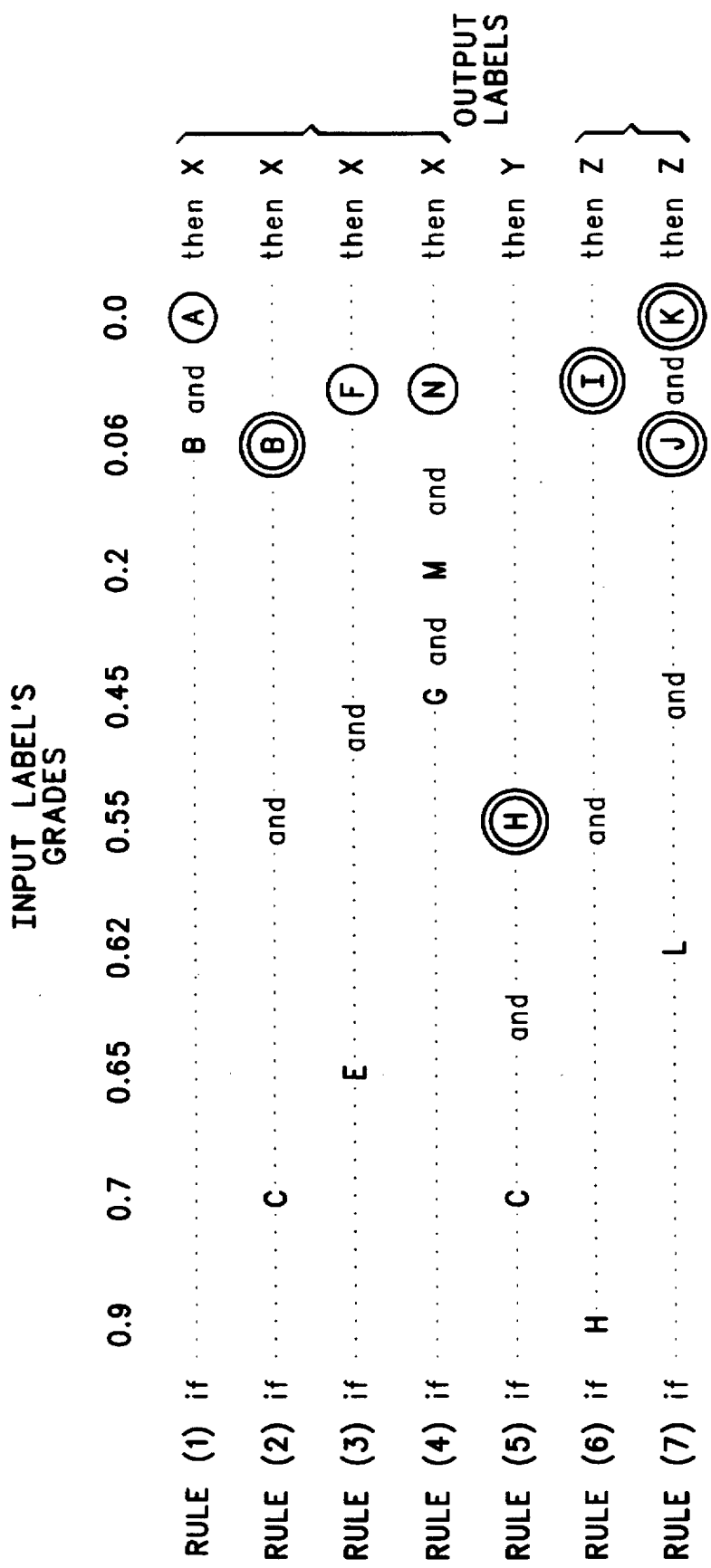
FIG. 10 illustrates in tabular form a chart which describes a concept in which input labels are rearranged in their grade magnitude order in accordance with the present invention.

In order to achieve the sorting function and the minimum-maximum detecting function illustrated in FIG. 10, the present invention prepares a plurality of coded rules where each of the plurality of coded rules is defined for a respective fuzzy rule. A coded rule for each fuzzy rule includes a valid/invalid bit array and represents which input labels are included in respective rule.

In the present embodiment of the invention, the input labels are alphabetically ordered in every fuzzy rule. A valid "1" bit indicates that an associated input label, such as label "A," is included in Rule (1). An invalid "0" bit indicates that its associated label, such as "C," is not included in Rule (1). An example of a valid/invalid bit array is illustrated in FIG. 11. In FIG. 11, valid/invalid bit array {11000000000000} indicates that only input labels A and B are included in an antecedent of Rule (1). Similarly, a bit array {00110000000000} illustrated in FIG. 12 indicates that only labels C and D are included in an antecedent of Rule (5).

FIG. 13 illustrates two dimensional arrays of valid/invalid bits. Such two dimensional arrays of valid/invalid bits may be obtained by arranging all coded rules where the same output labels are placed adjacent to one another. In this manner, a bit matrix is obtained. In the bit matrix, each row bit stream represents which input labels are included in a rule associated with the row and each column bit stream indicates which output labels are associated in an input label associated with the column.

Each of the column bit streams is referred to as a "rule-associative-bit-group" of a respective input label. For example, as illustrated in FIG. 13, the rule-associative-bit-group of label A is [1000000] and label N is [0001000]. These rule-associative-bit-groups are stored in a storage device, preferably a ROM. The rule-associative-bit-groups are addressed by input label. Stated another way, the rule associative-bit-groups can be accessed with identification label codes "a" through "n". Such defined memory is referred to as a "rule memory" or a "rule ROM." The input label's identification codes used as read addresses for the rule memory are referred to as "input label's codes" or "label codes".

Figure 14:
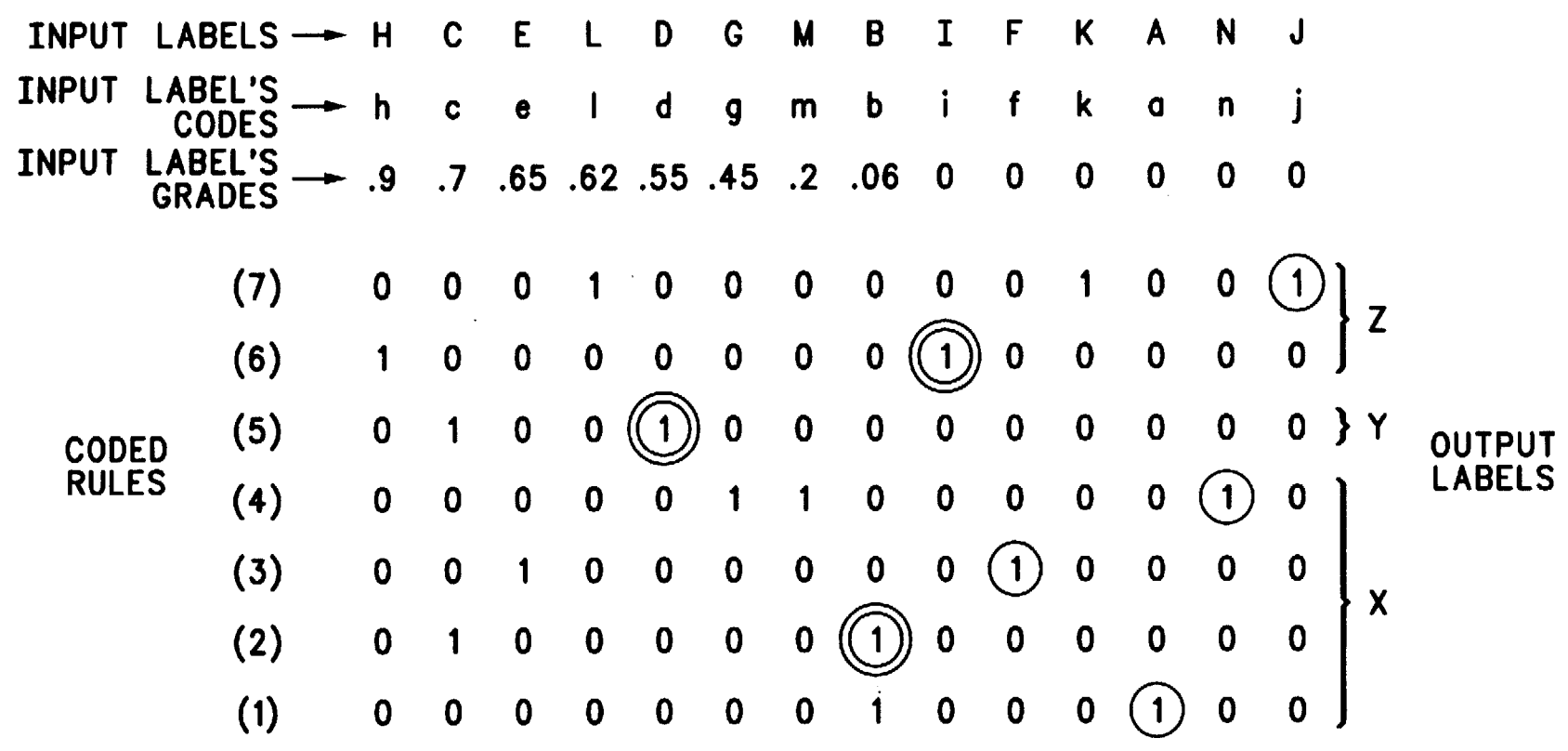

FIG. 14 illustrates a result of the sorting of the rule-associative-bit-groups in an order of the magnitude of their input label's grades. The sorting action illustrated from FIG. 13 to FIG. 14 does not modify the fuzzy rules or coded rules. For example, one must understand that rule "if A and B then X" and rule "if B and A then X" are substantially the same.

A right most valid bit ("1") for each of the coded rules illustrated in FIG. 14 may be detected as a minimum grade bit. The minimum grade bit is marked with a circle. Subsequently, a left most valid bit may be detected for each output label among the previously detected minimum grade bits. The detected left most bit is a maximum grade bit and is marked with double circles. An input label grade associated with the maximum grade bit is a minimum-maximum computation result to be obtained during the fuzzy logic operation.

As mentioned above, it is possible to perform minimum-maximum computations utilizing a spatial arrangement of the rule-associative-bit-groups. In the minimum-maximum computation circuit of the present invention, a minimum-maximum computation is performed sequentially in time and utilizes an order of the rule-associative-bit-groups. Sorting input labels in an order based on a magnitude of grades significantly improves execution time in both a spatial scheme and a time sequential scheme.

In prior art minimum-maximum computations, a comparison operation is repeatedly performed on every input label in each rule, one by one. If there are ten rules having input labels A and B, a prior art system executes the grade comparison between A and B for each rule. Thus, the same comparison is repeated ten times. According to the present invention, only one comparison operation between A and B is needed even if input labels A and B appear in many rules.

To sequentially order each of the rule-associative-bit-groups, input label codes are sequentially supplied to the rule memory according to their grade magnitudes' order. By noticing each bit position of the rule-associative-bit-groups read out from the rule memory, it may be observed that each of the coded rules is an arrangement of valid/invalid bits which may be modified by exchanging the arrangement of input labels in their grade's magnitude order.

A minimum grade detector is provided at each of the bit positions of the rule memory. The minimum grade detector detects the minimum grade based on two factors which include an input label grade (or sort-pointer) supplied from the input label sorter and a valid bit appearing last (or first) in each row bit stream output from the rule memory. For example, if the rule memory is accessed in an increasing order of the grade magnitudes, the minimum grade detector may detect the first grade appearing with a valid bit as the minimum grade. If the rule memory is accessed in decreasing order of the grade magnitudes) the minimum grade detector can detect the last appearing grade with a valid bit as the minimum grade.

According to the present invention, a maximum grade detector is provided for each of the plurality of output labels. The maximum grade detector detects a maximum grade from the detected minimum grades for each relevant fuzzy rule. The minimum-maximum operations may be realized by either software or hardware schemes in the present invention.

A weighting method for each of the fuzzy rules implemented by the present invention will be explained below. In the present invention, assume a weighting factor, W, where 0<W<1, is applied to each of Rule (2) and Rule (5). The application of weighting factor W on Rule(2) may be performed by multiplying weighting factor W to grades B and C which are included in antecedent of Rule(2), because Rule (2) is "if B and C, then X ". The multiplication operation may then be approximated by determining a smallest value from grades B, C, and weighting factor W. Similarly, applying weighting factor W to Rule(5) is approximated by a minimum operation in which the smallest value is selected from grades C, D, and weighting factor W.

Figure 15:
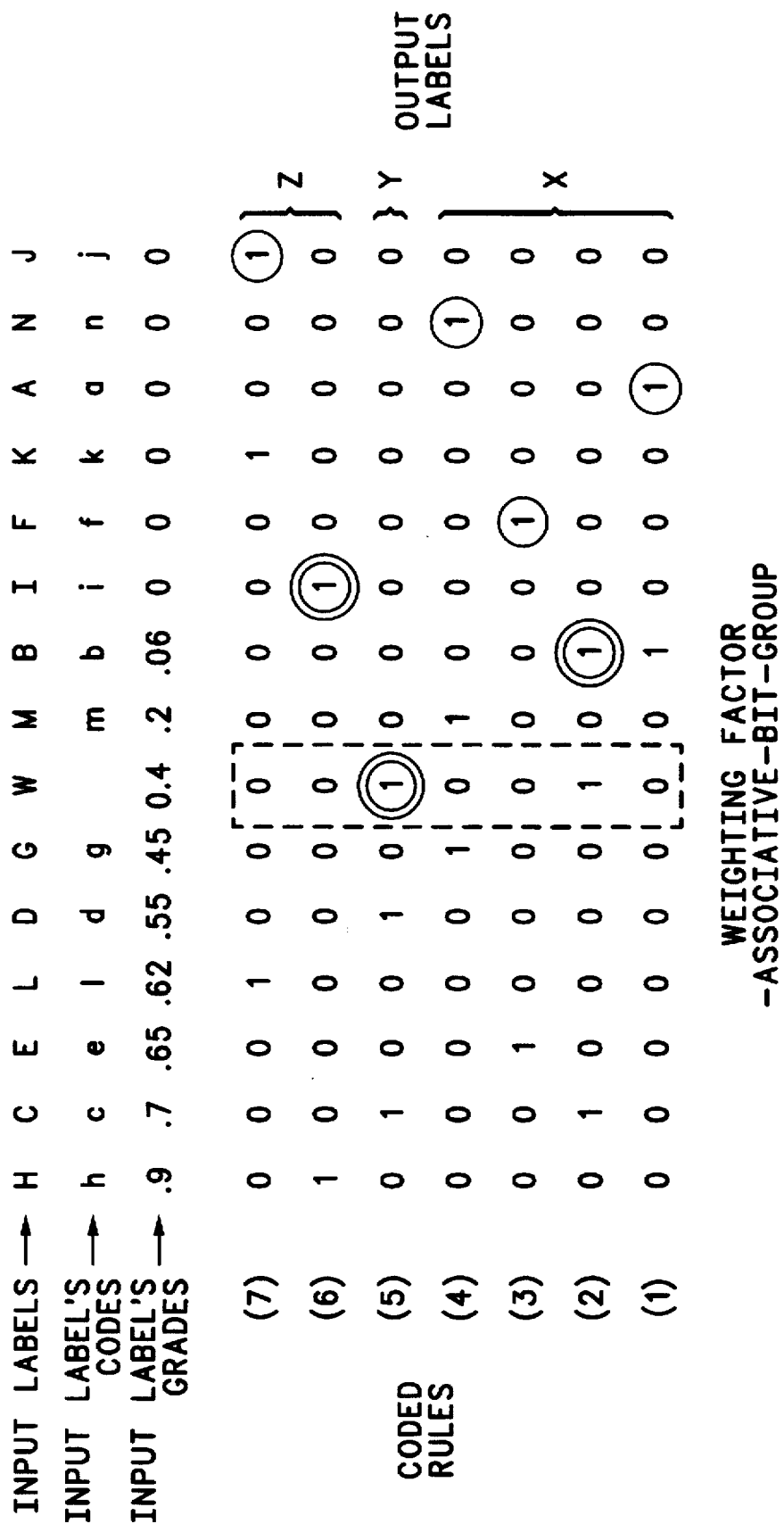
FIG. 15 illustrates in tabular form a chart which describes the weighting factor-associative-bit-groups in accordance with the present invention.

Assume that the above weighting factor is equal to 0.4. Furthermore, weighting factor-associative-bit-groups in which a valid bit "1" is set only for each of Rules (2) and (5) correspond to the rule-associative-bit groups having a smallest value of 0.4 illustrated in FIG. 15. In the weighting factor associative-bit-groups, a non-valid bit "0" is set for each of rules which are not weighted. In Rule (2), weighting has no effect because a minimum value among the grades corresponds to label B and is 0.06. The grade of label B is smaller than weighting factor 0.4 and, therefore, the minimum grade 0.06 will be selected during a minimum operation. On the contrary, weighting has an effect on Rule (5) because the minimum value among the grades corresponds to label D and is 0.55. She grade of label D is larger than weighting factor 0.4 and, therefore, the weighting factor of 0.4 will be selected by the minimum operation rather that the minimum grade 0.55. As described above, weighting factors are easily set and modified to improve the functionality of a controlling system. Such improved functionality is accomplished by treating the weighting factors in a same manner as each of the grades of input labels included in the antecedent of each of the rules and by introducing a new concept of the weighting factor-associative-bit-groups.

The minimum-maximum computation which includes the sorting of rule-associative-bit-groups described above may be performed by either a software or a hardware schemes. Furthermore in both software and hardware schemes, the computation may be implemented by various specific methods. A typical implementation will be explained as an embodiment of the present invention below.

FIG. 1 is a block diagram of a minimum-maximum computation circuit according to an embodiment of the present invention. The circuit includes input labels sorter 10 which sorts input label's grades with their label's codes according to the order of magnitude of the input label's grades. The circuit further includes rule ROM 20 as a rule memory, a group of grade registers 31–39 for storing output labels, a group of minimum-maximum detectors 41 through 49 corresponding to each of the fuzzy rules, Grade bus 51, Label Code bus 52, Valid Flag signal line 53, and address generating circuit 54. The circuit also includes weighting factor-associative-bit-groups memory 61, associative-bit-groups selecting circuit 62, weighting factor generating circuit 63, comparator 64, timing controlling circuit 65, and gating circuits 66, 67. A backend stage of the present devices which includes rule memory 20, the group of grade registers 31–39, and the group of minimum-maximum detectors 41 through 49 is illustrated for only one output channel for convenience. Although not illustrated herein, a plurality of the backend stages are arranged in a manner corresponding to each of a plurality of output channels in a real circuit.

The input label's grades to be sorted are calculated by a grades computation circuit (not illustrated) and supplied onto grade bus 51 in the originally arranged order of the input labels. In a typical system having eight input channels and nine input labels in each channel, the total of seventy-two input label grades appear on grade bus 51.

At the same time that an input label's grades appear on Grade bus 51, correlated input label's codes appear on Label Code bus 52. Each of the label codes of input labels defined for each of the input channels may be discriminated from one another by assigning each of the input channels different numbers. Furthermore, each of the input channels may be discriminated from one another by combining inter-channel successive numbers and in-channel successive numbers or unique successive numbers.

In a typical fuzzy inference system, most of the input label's grades appearing on Grade bus 51 are equal to zero. For example, if each input channel has nine input labels and each of the input label membership functions crosses only neighboring membership functions, then a maximum of two non-zero grades are output from each input channel. Therefore, out of a total of seventy-two input grades in a total of eight channels, a maximum of sixteen grades are non-zeros and a remaining fifty-six grades are equal to zero (referred to as "zero grade").

The minimum-maximum detector described in the present embodiment of the invention efficiently evaluates zero grades of antecedents in fuzzy rules which occupy most of the input label's grades to save execution time and reduce hardware size. For this purpose, the grade computing circuit provides a valid/invalid flag onto the Valid Flag signal 53. The Valid Flag signal 53 indicates non-zero grades when asserted and indicates zero grades when negated.

Input labels sorter 10 receives input label's grades supplied from grade bus 51, eliminates zero grades, and sorts non-zero grades in a magnitude order. Input labels sorter 10 essentially comprises two groups of registers. A first group is for storing input label's grades and a second group is for storing correlating input label's codes.

The elimination of zero grades and the sorting of non-zero grades in their magnitude order are performed by latching grades which appear on Grade bus 51 into one of the data registers selected according to the magnitude of the grade which includes a correlated label code when Valid Flag signal 53 is asserted. Such an input labels sorter 10 is implemented using appropriate circuitry.

After input labels sorter 10 completes sorting grades and correlated label codes, every grade resister 31 through 39 is initialized to zero. Then, according to sequential addresses supplied from address counter 54, the input label's grades stored in input labels sorter 10 are output in an increasing magnitude order (from small to large) of their magnitudes onto Grade bus 51. Simultaneously, correlated label codes are output from input labels sorter 10 onto Label Code bus 52. Each of the label codes placed on Label Code bus 52 is provided to the address input terminal of rule ROM 20. Rule-associative-bit-groups stored in the memory are supplied to the minimum-maximum detectors 41 through 49 through the associative-bit-groups selecting circuit 62.

As illustrated in FIG. 2, each bit of the rule associative-bit-groups read out from rule ROM 20 is supplied to a logic circuit including nine minimum-maximum detectors 41, 42, . . . , 49 arranged in a manner corresponding to nine output labels. Each of the minimum-maximum detectors has a number of minimum detectors which is the same as a largest possible number of rules which can be defined in relevant output labels. Each of the minimum-maximum detectors also has an OR gate to perform a logical OR operation on the output of each of the minimum detectors. As is representatively illustrated in FIG. 2 by minimum-maximum detector 41, if an output label to be computed by minimum-maximum operation includes four rules, four minimum detectors 411, 412, 413 and 414 and an OR gate 415 for performing a logical OR operation will be included in the minimum-maximum detector.

Referring to FIG. 2, the minimum detectors 411 through 414, respectively corresponding to four Rules (1)–(4), detect a first valid bit "1" provided in the relevant coded rule which appears in either a relevant bit position of the rule-associative-bit-groups read out from rule ROM 20 or weighting factor-associative-bit-groups generated by weighting factor-associative-bit-groups memory 61. The rule-associative-bit-groups are passed through associative-bit-groups selecting circuit 62 selectively and the weighting-associative-bit-groups are generated in weighting-associative-bit-groups generating circuit 61 and selectively passed through associative-bit-groups selecting circuit 62. Subsequently, a "1" is output to an input terminal of OR gate 415. In other words, no additional valid bits are asserted, "1," or output from each of the minimum detectors 411 through 414 even if a second and a third valid bit "1" appear in the relevant coded rules. A construction of such a minimum detector 410 is illustrated in FIG. 3 and will be subsequently discussed.

Associative-bit-groups selecting circuit 62 selects one of the rule-associative-bit-groups read from rule ROM 20 and one of the weigh-associative-bit-groups generated by the weight-associative-bit-groups generating circuit 61 when input label's grades are provided by input labels sorter 10. Circuit 62 executes the selection operation in response to both the Timing Control signal 75 provided by the timing controlling circuit 65 and a selected one of the rule-associative-bit-groups or weighting factor-associative-bit-groups that are provided to each of the minimum grade detectors 41 through 49 via Bus 68.

A particular case which arises when the weighting factors for the fuzzy rules are all "1" will be explained first. In this particular case, an operation is performed in which rule-associative-bit-groups provided by rule ROM 20 are always selected by the associative-bit-groups selecting circuit 62 to be supplied to the minimum grade detectors 41 through 49. Furthermore, gate 66 is always opened, while gate 67 remains closed in response to control provided by weighting operating part 63, 64 and 65.

After input labels sorter 10 completes sorting grades and label codes, each of the plurality of grade resisters 31 through 39 is initialized to zero. Then, the input label grades and relevant label codes are provided by input label sorter 10 in an increasing order (from small to large) of their magnitudes. Each of the label codes placed on Label Code bus 52 is provided to an address input terminal of rule ROM 20 to access a rule-associative-bit-group stored in the memory. Each bit of the rule-associative-bit-group, is provided to the minimum grade detectors 411 through 414 illustrated in FIG. 2. Each bit of successive rule-associative-bit-groups is provided to the minimum grade detecters 411 through 414, with minimum detecter 411 receiving the bits corresponding to rule (1), minimum detecter 412 receiving the bits corresponding to Rule (2), etc. In this way, minimum detecter 411 receives all of the bits of encoded Rule (1), minimum detecter 412 receives all of the bits of encoded Rule (2), etc. as illustrated in FIG. 2.

The minimum grade detectors 411 through 414 output a "1" to an input of OR gate 415 when each of the minimum grade detectors detects the first valid bit "1" among the bit stream (encoded rule) supplied by rule ROM 20. As a result, a logic "1" value is provided by OR gate 145 for instructing the corresponding grade register 31 to latch data. Upon receiving the "1" from OR gate 411, grade register 31 latches a current input label's grade being transferred via Grade bus 51. Therefore, each of the minimum grade detectors 411 through 414 functions to enable data register 31 to store an input label's grade which is output first from input label sorter 10 and is among the input label's grades included in the antecedent of the corresponding rule.

The first input label's grade appearing with a valid bit to be latched in the grade resister 31 is a minimum antecedent included in the antecedents of the corresponding rule because input label's grades appear on Grade bus 51 in their increasing magnitude order. Thus, each of the minimum grade detectors 411 through 414 performs a function to realize a part of the minimum computation for grades of input labels included in the antecedent of the corresponding rule.

Grade registers 31, and 32–39 latch the current input label's grade appearing on Grade bus 51 to replace an old grade stored therein when grade register 31 receives a "1" from a corresponding minimum grade detector. Thus, when input label sorter 10 completes outputting all label grades contained for a certain rule, grade registers 31, and 32–39 latch a minimum input label's grade corresponding to minimum grade detector 411–414 which output "1" last. The input label's grades stored in each of grade registers 31, and 32–39 are the largest grades among a group of minimum grades relevant to a corresponding output label because each of the input label grades sequentially appears on Grade bus 51 in an increasing magnitude order.

Therefore, each of minimum grade detectors 411 through 414 performs a minimum operation function. Furthermore, together with OR gate 415, the minimum grade detectors 411 through 414 perform a part of the minimum-maximum computation. A remaining portion of the minimum-maximum computation is performed by input labels sorter 10 which provides the sorted input label's grades in their increasing magnitude order onto the Grade bus 51. The function of minimum-maximum computation is the same for each of the remaining minimum-maximum detectors 42 through 49. Min-max detecting circuit 42 through 49 are arranged to correspond with each of the remaining output labels included in the output channel. Furthermore, additional minimum-maximum detectors may be arranged to correspond to each of the remaining output labels included in output channels not illustrated in FIG. 1.

In this manner, when input labels sorter 10 completes outputting sixteen non-zero grades, each of the grade registers 31 through 39 stores the input label's grade which is a result of the minimum-maximum computation performed on the input label grades relevant to the corresponding output channel. The resultant label grades stored in grade registers 31 through 39 are transferred by Grade bus 51 to a following stage where a defuzzification operation such as the center of gravity calculation method is performed to obtain final control outputs for each of output channels.

Each of the minimum grade detectors 411 through 414, as represented by the minimum grade detector 414 illustrated in FIG. 3, comprises a back stage including D-type flip-flop 411a and AND gate 411b, and a front stage including two J-K flipflops 411c and 411g, switch circuit 411d and two logic gates 411e and 411f. The minimum grade detector executes a portion of the minimum-maximum operation performed on sorted input labels. The back stage performs a differential function to output "1" during a half clock period at a transition of "0" to "1" of the output signal of OR gate 411f.

On the other hand, both J-K flipflop 411g and the OR gate 411f inhibit the back stage from performing the differential function on unused fuzzy rules. Both J-K flipflop 411c and OR gate 411f inhibit the back stage from performing the differential function when any one of the following cases occurs:

(1) An invalid input label that does not contribute to the corresponding rule appears during sort operation;

(2) A valid input label contributing rules has a zero grade; or (3) After the first valid bit has been detected (i.e., the minimum grade has been detected for a rule), then further bits should be inhibited.

To one input terminal of NOR gate 411e, a signal is supplied to indicate that input label sorter 10 is executing either a sort operation ("0") or an output operation ("1"). Another input terminal of NOR gate 411e receives a signal from Valid Flag signal 53 to indicate that a current input label's grade to be sorted is either zero ("0") or non-zero ("1").

Before input labels sorter 10 initiates its sorting operation on input label grades, a preset signal initializes J-K flipflop 411g to a "1" state and J-K flipflop 411c to a "0" state. Then, input labels sorter 10 initiates the sort operation and rule ROM 20 is accessed by label codes appearing on Label Code bus 52. During the sort operation, one input terminal of the NOR gate 411e remains "0" as described above.

If the other input terminal of the NOR gate 411e receives a "0" which indicates that the current input label's grade appearing on Grade bus 51 is a non-zero grade, then NOR gate 411e outputs a "1" and switch 411d turns to a state illustrated in FIG. 3 by a dotted line. In this state, J-K flipflop 411g turns from the initial state "1" to "0" if an input terminal IN receives a valid bit "1" appearing in a relevant coded rule. On the other hand, if the other input terminal of NOR gate 411e receives "1" indicating a zero grade while the input terminal IN is receiving a valid bit "1", then NOR gate 411e outputs a "0" to cause switch 411d to be in the state illustrated in FIG. 3 by a solid line. As a result, J-K flipflop 411c trips from the initial state "0" to "1". Then, the output of OR gate 411f becomes "1". In this manner, when the sort operation on input label's grades is complete, the output of OR gate 411f is "0" if each of input label grades was not zero for each valid bit "1" included in relevant coded rule. Otherwise, the output of OR gate 411f remains in the initial state "1". The output state "1" of OR gate 411f is provided either when any one of input label grades inducded in encoded rule is zero or when no valid bit "1" appears in encoded rule.

After input label's sorter 10 initiates its output operation of the sorted input label grades and their associated label codes, the input of NOR gate 411e receives a "1" and switch 411d trips to the state illustrated in FIG. 3 by the solid line. The valid/invalid bits of coded rules read from rule ROM 20 are fed to a J-input terminal of J-K flipflop 411c through switch 411d. If both J-K flipflops 411c and 411g are in a state "0", then a Q output of D flipflop 411a remains "0". Therefore, a "0" is supplied to the inverting input terminal of AND gate 411b causing it to output a "1" through output terminal OUT at the time the valid/invalid bit trips to "1" for the first time.

On the other hand, if either J-K flipflop 411c or 411g is in the state "1" when input lables sorter 10 initiates its output operation of the sorted input label's grades, then the "1" signal on the inverting input terminal of AND gate 411b keeps output terminal OUT as "0". The latching of input label's grade is effectively inhibited. In this manner, minimum detector 411 is inhibited from performing the minimum computation when either any one of the input label grades included in the antecedent of the corresponding encoded rule was zero or the encoded rule was an unused rule having no input label in its antecedent.

Such inhibiting functions are required for the following reasons. For the first reason, although the input labels sorter 10 eliminates zero grade input labels, the fundamental principle of the min-max computation does not allow such easy deletion of zero grades. That is, the principle of the min-max operation requires the same operation on both zero grades and on non-zero grades to obtain a zero result from zero grade.

The easy deletion of zero grades may cause incorrect results by detecting a minimum non-zero grade. To avoid the incorrect operation resulting from easy deletion of a zero grade, a single bit of information is provided to inhibit further execution of the minimum operation. By inhibiting further execution of the minimum operation, the grade registers maintain an initial state of "0" to provide a correct result of the minimum-maximum computation in this case.

For the second reason, if a particular input label's grades computation circuit is used for calculating input label grades, there will be a case in which valid data is supplied to the input label sorter 10 after sorter 10 has initiated a sorting operation and while a input label grade defined by a II type membership function is under calculation. For this reason the minimum detection is inhibited by one bit signal.

Now, at the completion of minimum-maximum operations, each of the grade registers (for example, each of nine grade registers per output channel), holds a non-zero grade as a result. The nine output label grades per output channel are transferred to a following defuzzifier stage to be used in MAX defuzzification operations. To reduce the execution time of such defuzzification operations, each full membership function of the output is replaced by corresponding singleton data which includes a vertical line of unit length indicating a position of the corresponding membership function's center of gravity. Each unit length singleton data is cut so as to have a length defined by a magnitude of the associated output label's grade.

As described above, the special case in which all the weighting factors for the fuzzy rules are assumed to be 1.0 has been explained first. Therefore, the weighting function doesn't perform at all. A case in which the weighting function performs will be explained next. In the embodiment of the invention illustrated in FIG. 1, weighting factors for the rules are defined to be equal to one of 1/8,2/8,3/8, . . . 8/8. The weighting factors are generated by weighting factor generating circuit 63 in an increasing order to be 1/8, 2/8,3/8, . . . 8/8. These weighting factors are then successively supplied to weighting factor-associative-bit-groups generating circuit 61 and the comparator 64.

As illustrated in FIG. 4, the weighting factor-associative-bit-groups memory 61 comprises a group of registers R1-Rn for storing weighting factors for the corresponding rules. Circuit 61 also includes a group of comparators CMP1-CMPn which compare the stored weighting factors in the corresponding registers and the weighting factors generated by the circuit 63 to be provided via Bus 72 and then provide either a valid signal "1" or an invalid signal "0" in response to a result of the comparison. A number of the registers and the comparators is the same as the total number of fuzzy rules. Additionally, although ⅛ is assumed to be the smallest value of the weighting factors, 0 may be added to the weighting factors as the smallest value. Furthermore, as described above, an output of the sorted input label grades from sorting circuit 10 is performed in their increasing magnitude order and a case is assumed that weighting factor ⅛ is provided via Bus 72.

Referring again to FIG. 1, the upper three bits of the grade which are output on Grade bus 51 from input labels sorter 10 are supplied to one of two input terminals of comparator 64 to be compared with the smallest weighting factor ⅛ supplied to another input terminal of the comparator 64. The comparator 64 provides a low output to timing control circuit 65 if the grade appearing on Grade bus 51 is smaller than a current weighting factor of 1/8. In this case, timing control circuit 65 also provides a low output signal via signal 73 to enable gate 66 to connect Grade bus 51 to bus 69 and to make gate 67 disconnect bus 69 from bus 72.

Additionally, while the signal transferred via signal 73 remains low, the associative-bit-groups selecting circuit 62 selects rule-associative-bit-groups read from rule memory 20 to be distributed to the minimum-maximum detectors 41 through 49. While the output of comparator 64 remains low, timing control circuit 65 also outputs successive pulses of a predetermined period to enable address generating circuit 54 to generate address signals which increase successively. This is a first operation of the minimum-maximum computation performed on the input label's grades when the input label's grades appearing on Grade bus 51 are smaller than the weighting factors.

When the input label's grade appearing on Grade bus 51 becomes larger than the current weighting factor of 1/8, the output of the comparator changes to a logic high value from a low value and timing control circuit 65 asserts signal 73. When signal 73 is asserted, gate 66 disconnects Grade bus 51 from bus 6, and the gate 67 connects signal line 72 to the upper three bits of bus 69. Note that the lower five bits of bus 69 are held low. Further, when the signal on signal line 73 is asserted, associative-bit-groups selecting circuit 62 selects the weighting factor-associative-bit-groups generated in weighting factor associative-bit-groups generating circuit 61 to be distributed to the minimum-maximum detectors 41 through 49 through bus 68. As a result, for rules corresponding to a valid bit included in the weighting factor-associative-bit-groups, the weighting factor appearing on the bus 69 is latched to a corresponding one of registers 31 through 39. Therefore, for the relevant rules, the same minimum-maximum computation executed on the input label grade included in the antecedents is executed on the weighting factor.

When the output of comparator 64 is asserted, timing controlling circuit 65 suspends output of successive pulses on signal 75 to enable address signal generating circuit 54 to stop incrementing the address signal provided to input label's sorter 10. Concurrently, timing controlling circuit 65 supplies a pulse to weighting factor generating circuit 63 using signal line 74 to enable weighting factor generating circuit 63 to increase the weighting factor to a new value of 2/8 from the previous value of 1/8. This is a second part of the minimum-maximum computation performed on the weighting factors when the input label's grades appearing on Grade bus 51 is smaller than the weighting factors appearing on the signal line 72.

Comparator 64 compares the increased weighting factor of 2/8 on the signal line 72 and the input label's grades on Grade bus 51. When the input label's grades are smaller than the weighting factor, the first part of minimum-maximum computation described above will be repeated. In the other case, the second part of minimum-maximum computation will be repeated. As a result, the same minimum-maximum computations are performed as if there were one of input label's grades included in the antecedent of the fuzzy rules.

In the present invention, an approximation approach for reducing calculation time is implemented. The approximation approach uses only the two largest height singleton data for calculating the center of gravity and does not use all of the singleton data processed during the defuzzification operation. For this approximation approach, it becomes necessary to select the largest and the next largest input label's grades among the nine grades stored in each of the nine grade resisters 31 through 39. When the selection of the two largest grades is performed in the following defuzzification circuit, a number of comparisons are performed between the nine grades such that computation time is incremented or an increased number of comparators will be required. The increased number of comparators will result in the circuit being complex and expensive.

These problems will be solved by another embodiment of the present invention in which only the largest and the next largest grades are selectively latched during the minimum-maximum computation process by using a selective latch circuit illustrated in FIG. 5.

In the selective latch circuit illustrated in FIG. 5, the nine grade registers 31 through 39 of FIG. 1 are replaced by the elements illustrated in FIG. 5. In FIG. 5, the same reference numbers are used for the same elements that are illustrated in FIG. 1. The selective latch circuit includes a group of cascaded three grade registers 111 through 113, a group of similarly cascaded three label registers 121 through 123, a grade matching detector 114 which detects matching between two grades stored in each register, and a label matching detector 124 which detects matching between two labels stored in each register.

Outputs of circuits 411 through 49 are directly connected to output label register 121. A logical sum of the outputs of circuits 41 through 49 is input to D-type flipflop 132 through OR gate 131. When any one of the circuits 41 through 49 outputs a "1", D-type flipflop 132 is set to "1". A current grade appearing on Grade bus 51 is always latched by grade register 111 and the outputs of circuits 41 through 49 are concurrently latched by output label register 121. However, the "output label" used here is different from the input label code used for accessing rule memory 20 illustrated in FIG. 1. In FIG. 5, the "output label" is the same as a column bit stream provided by the nine minimum-maximum detectors 41 through 49. The bit position of "1" of the output label indicates which output label is relevant to a current grade stored in grade register 111. The grade latched in grade register 111 is compared with the contents of grade register 112 by comparator 114 and the output label stored in label register 121 is concurrently compared with the contents of label register 122 by comparator 124. Following are a series of cases which use the circuit illustrated in FIG. 5.

Case A: The contents of label register 121 do not match the contents of label register 122 because they each indicate a different output label. Additionally, the contents of grade register 111 do not match the contents of the grade register 112 because they each indicate a different grade.

The contents of grade register 112 are transferred to grade register 113 and the contents of grade register 111 are transferred to grade register 112. The contents of label register 122 and the inverted contents of label register 121 are AND'ed and subsequently transferred to label register 123 through a switch 127 and an AND gate 128. Concurrently, the contents of label register 121 are transferred to label register 122 through OR gate 126.

Case B: The contents of label register 121 do not match the contents of label register 122, but the contents of grade register 111 matches the contents of grade register 112 to indicate that the grade registers store the same grade.

The contents of label register 123 and the inverted contents of label register 121 are AND'ed together and then transferred to label register 123 through switch 127 and AND gate 128. Subsequently, the contents of label register 121 and the contents of label register 122 are OR'ed and then transferred to label register 122 through OR gate 126.

Case C: The contents of label register 121 match the contents of label register 122 because each has the same label. However, the contents of grade register 111 do not match the contents of grade register 112.

The contents of grade register 111 are then transferred to grade register 112.

Case D: The contents of label register 121 match the contents of label register 122 and the contents of grade register 111 match the contents of grade register 112.

No action takes place in this case.

In the Case A, a new largest grade which appeared on Grade bus 51 is latched into grade register 111 and an old largest grade is transferred from grade register 112 to grade register 113 as a new next largest grade. Concurrently, the contents of grade register 111 are transferred to grade register 112 as a new largest grade. Accordingly grade register 112 latches the largest grade which appeared on Grade bus 51 and grade register 113 latches the next largest grade. Label registers 122 and 123 latch labels corresponding to the largest and next largest grade, respectively. Storing an identical label in both label registers 122 and 123 can be prohibited by AND'ing the contents of label registers 122 and the inverted contents of label register 123 being provided to label register 123.

At the moment the last sorted input label grade has appeared on Grade bus 51, the largest grade and the next largest grade are stored in the grade resisters 112 and 113, respectively.. The corresponding output label codes are stored in label resisters 122 and 123. The contents of each register is transferred to a next stage, a defuzzifier, to obtain final output data.

FIG. 6 shows a block diagram illustrating a minimum-maximum computation circuit for fuzzy inference according to another embodiment of the present invention. In FIG. 6, only a portion of minimum-maximum computation circuit corresponding to minimum-maximum detector 41 and resister 31 in FIG. 1 is illustrated. In other words, the portion of minimum-maximum computing circuit illustrated in FIG. 6 is representative of nine circuits where each of the circuits includes a pair of a minimum-maximum detector 41 and a resister 31, a pair of a minimum-maximum detector 42 and a resister 32, through a pair of a minimum-maximum detector 49 and a resister 39. A remaining portion of the minimum-maximum computing circuit not illustrated in FIG. 6 is the same as that illustrated in FIG. 1.

In this embodiment of the invention illustrated in FIG. 6, after input labels sorter 10 completes sorting the input labels, sorted input label's grades are output on bus 69 in a decreasing magnitude order (from large to small). The weighting factors are also generated and output in a decreasing magnitude order. Four minimum grade detectors 511, 512, 513 and 514 are arranged to receive each of the coded rules included in each of bit position of the rule-associative-bit-groups when they are successively provided by rule ROM 20. The minimum grade detectors include resistors for latching input label's grades or weighting factors that are successively provided by bus 69. The resistors latch data when valid bits included in rule-associative-bit-groups or weighting factor-associative-bit-groups selected by associative-bit-groups. The data latch enables them to latch a smallest input label's grades or weighting factors appearing on bus 69 corresponding to the last valid bit appearing in each of the coded fuzzy rules. Maximum grade detector 521 selects a largest one among the smallest input label's grades or weighting factors latched in the minimum detectors 511 through 514 to perform a maximum computation.

An AND gate and a flip-flop included in each of the minimum grade detectors 511 through 514 are additional elements which are used when zero grades are provided. When a valid zero grade is provided while input label's grades are being sorted by sorter 10, an output of a relevant AND gate is asserted to set an associated flip-flop. Each of the minimum grade detectors including the set flip-flop is inhibited to latch grades or weighting factors to its register during the period when the sorted input label's grades are being provided by sorter 10. Then, the contents of the register are excluded from the selection of maximum value by maximum detector 521.

FIG. 7 is a detailed block diagram illustrating the input lables sorter 10 in greater detail. Input labels sorter 10 includes a Grade bus 51 which communicates input label's grades provided by a preceding grade calculator (not illustrated), a Label Code bus 52 which communicates input label code associated with the grade concurrently appearing on Grade bus 51, and a write enable (WE) signal line 53, on which a valid/invalid flag is provided to indicate whether an input label's grade on a data bus is a non- zero grade or a zero grade. It should be noted, in sorter 10, the valid/invalid flag is inverted from a case described during explanation of FIGS. 1 and 3. Therefore, the valid flag indicates a zero grade is "0" and an invalid flag indicates a non-zero grade is "1". Input label sorter 10 also includes a group of cascaded registers 211, 212, 213, . . . and 221, 222, 223, where each of the groups of cascaded registers has a two-input selector at its input. Additionally, input label sorter 10 includes a group of cascaded selector controllers 231, 232, 233, where each of the group of cascaded selector controllers controls the selecting operation of an associated selector.

Each of the registers 211, 212, 213, . . . comprises a grade register GR and a two-input grade selector GS placed at the input of grade register GR. One input terminal A of grade selector GS is connected to Grade bus 51 and the other input terminal B is connected to the output of the grade register GR of the preceding stage. The output of grade selector GS is connected to its associated grade register GR. Each of the registers 221, 222, and 223 comprises a label code register LR and a label code selector LS having two input terminals and placed at the input of the label code register LR. One input terminal A of the label code selector LS is connected to Label Code bus 52 and the other input terminal B is connected to the output terminal of the label code register LR of the preceding stage. The output terminal of the label code selector LS is connected to its associated label code register LR.

Each of the grade selectors GS and the label code selectors LS connects its input terminals A to its output terminal when selection code SA is a logic high value. Each of the grade selectors GS and the label code selectors LS connects the input terminal B to the output terminal, when selection code SB is the logic high value. Each of the grade selectors GS and the label code selectors LS connects neither the input terminal A nor the input terminal B to the output terminal when both of the selection codes SA and SB are logic low values. Each of the grade selectors GS and the label code selectors LS are inhibited when both of the selection codes SA and SB become a logic high value concurrently. Each of the selector controllers 231, 232, and 233, . . . comprises a comparator (CMP) for performing a magnitude comparison between a grade Di stored in its associated grade register GR and data DDn appearing on Grade bus 51, a D-type flip-flop FF storing a comparison result of the comparator CMP, and a logic circuit including a pair of AND gates A1 and A2. A comparator CMP of each of the selector controllers outputs a logic high value to flip-flop FF when DDn is less than or equal to Di.

Before input label's grades appear on Grade bus 51, grade register GR of each stage register 211, 212, and 213, . . . is initialized to an initial value by a reset signal supplied from a signal line RST. If the input label's grades have eight-bit widths, an initial value may be a maximum hexadecimal value of $FF of the grades. In the following example, the input label's grades are assumed to have eight-bits width and the initial value are assumed to be $FF.

After resetting grade registers GR, a grade estimator (not illustrated) in the preceding stage sequentially outputs input label's grades to Grade bus 51 and provides corresponding input label codes to Label Code bus 52. When a current grade appearing on Grade bus 51 is a valid data with a non-zero value, the grade estimator also outputs the write enable (WE) signal onto line 53 to allow latching of the currently appearing grade.

When the first non-zero grade DD1 appears on Grade bus 51 on a rising edge of a clock signal (not illustrated), the comparator CMP in each of selector controllers 231, 232, and 233, . . . compares grade DD1 with grade Di (=FF) stored in its associated grade register GR. In every stage, comparator CMP outputs a logic high level signal because DD1 is smaller than the stored initial value [FF]. The D-type flipflop FF in each stage latches the high logic level signal at a falling edge of the clock signal, asserts signal line S2 to notify a subsequent stage that the comparison result of its own stage was DD1≦Di.

In every selector controller other than the first stage selector controller, the S2 signal is received by logic circuit A1 and A2 as a signal SI. The first stage selector controller 231 receives a constant logic low signal on signal line S1 because there is no preceding stage. Therefore, in a case of a comparison result DD1≦Di, the outputs of the first stage AND gates A1 and A2 are a logic high value and a logic low value, respectively. The associated grade selector GS receiving the combination (high, low) connects Grade bus 51 to its associated grade register GR at the rising edge of the clock signal. Thus, the first grade DD1 appearing on Grade bus 51 is transferred to a first stage grade register GR.

On the other hand, in each of the second stage and the following selector controllers 232, 233, and 234, AND gates A1 and A2 respectively output logic low and logic high values because the logic high level signal from the preceding stage exists on signal line SI. The associated grade selector GS receiving the combination (low, high) connects the preceding grade register GR to its associated grade register GR at a falling edge of the clock signal. Thus, the initial value [FF] stored in each of the preceding registers 211, 212, and 213 is shifted out to subsequent registers 212, 213, and 214.

As a result of this operation, in a first stage register 211, a grade DD1 which appeared first on Grade bus 51 is latched into the grade register GR, and in the following stage registers 212, 213, and 214, the initial values [FF] are shifted from a preceding staged register and are latched in a corresponding grade registers GR. When a second non-zero grade DD2 appears on Grade bus 51, either one of two data transferring operations will be executed depending upon the comparison result between DD2 and DD1. The case of DD2≦DD1 is described first below.

The first stage selector controller 231 compares new grade DD2 with grade DD1 stored in its associated grade register GR. In the present example, DD2≦DD1 and this causes the associated grade selector GS to perform a similar operation to the case performed when the first grade DD1 appeared on Grade bus 51 and the new grade DD2 is stored in grade register GR in register 211 at a falling edge of the clock signal.

In each of the second and the following stage selector controllers 232, 233, and 234, AND gates A1 and A2 output signals having a respective low and high logic value. Thus, data DD1 and the initial value [FF] stored in grade registers GR 211, 212, and 213 are shifted to subsequent registers at a falling edge of the clock signal in a similar manner to that employed for storing DD1.

As a result, the first stage grade register GR of register 211 stores grade DD2 and the second stage grade register GR of register 212 stores grade DD1 which was shifted from the grade register GR of the preceding register 211. The third stage and the following grade registers GR of registers 213 and 214 store the initial values [FF] shifted from the grade registers GR of the preceding registers.

Next, a case in which DD2 is greater than DD1 is described below. In this case, the first stage comparator CMP in selector controller 231 outputs a logic low signal and the combination of the output of AND gates A1 and A2 both become a logic low value. The first stage grade selector GS of register 211 does not connect either input terminal A or B to its associated grade register GR. Thus, the first stage grade register GR of register 211 continues to hold previously stored grade DD1.

While, the second stage comparator CMP in selector controller 232 outputs a logic high level, because its associated grade register holds a maximum value [FF]. On the other hand, the comparison result of the first stage selector controller 231 outputs a logic low value to signal line S2. Thus, the combination of the second stage AND gates A1 and A2 respectively become a logic high value and a logic low value. The second stage grade selector GS of register 212 connects Grade bus 51 to its associated grade register GR. As a result, the second stage grade register GR stores a current grade DD2 (which is greater than DD1).

In the third stage and the following stages, the comparison results of selector controllers 233 and 234 are logic high levels and the preceding stage's comparison results are also logic high levels. Thus, the combination of the output of the AND gates A1 and A2 respectively becomes a logic low value and a logic high value. As a result, registers 213 and 214 receive the initial values [FF] shifted out from the preceding registers 212 and 213.

As described above, the first stage grade register GR of the register 211 stores the smaller one of grades DD1 and DD2. A larger one is stored in the second stage grade register GR of register 212.

The data transferring operations described above are summarized as follows:

A. The selector controller of the first stage:
  A1) shifts the grade stored in the preceding grade register to its associated grade register if a current grade appearing on Grade bus 51 is equal to or less than both of the grades stored in its associated and the preceding grade registers;
  A2) transfers a currently appearing grade from Grade bus 51 to its associated grade register if the current grade is greater than the grade stored in the preceding stage's grade register but equal to or less than the grade stored in its associated stage's grade register; or
  A3) performs no data transfer and maintains the grade previously stored in its associated stage's grade register if a current grade appearing on Grade bus 51 is greater than the grade stored in the associated grade register.

B. The selector controller of the first stage
  B1) transfers the current grade appeared on Grade bus 51 to the associated grade register, if it is equal to or smaller than the grade stored in the associated grade register;

B2) performs no data transfer to its associated grade register, if a current grade on Grade bus 51 is greater than the grade already stored in the associated grade register.

Referring to FIG. 5, registers 221, 222, and 223 are each arranged to form pairs between registers 211, 212, and 213, and to perform data transfer operations in the same manner as registers 211, 212, and 213, do under the control of an associated selector controller 231, 232, and 233. As a result, each of the label codes appearing on Label Code bus 52 associated with each of the grades appearing on Grade bus 51 is stored to one of the label code registers LR corresponding to the grade registers in each of the stages.

If membership functions for input labels included in input data channels of fuzzy inference are defined such that only two neighboring membership functions can cross each other, then a maximum of two non- zero grades can be provided by each of the input data channels. Therefore, by choosing the numbers of registers' stages to be equal to two times the number of input data channels, all of the non-zero grades may be sorted in grade registers GR.

Input label's grades sorted in their magnitude order are provided by the grade registers to Grade bus 51 through gates GG when the read enable (RE) is supplied according to an order of the arrangement of the grade registers. Concurrently with the output of the grades, the associated label codes are provided by the label code registers LR on to Label Code bus 52 through gates LG.

FIG. 8 illustrates a block diagram of another embodiment of the minimum-maximum computation circuit according to the present invention. In FIG. 8, elements which are the same as those used in the system of FIG. 1 have the same reference numerals. Therefore, description of the same elements as those in FIG. 1 will be omitted here to avoid duplicated description. In the minimum-maximum computation circuit illustrated in FIG. 8, an modification is made by replacing input labels sorter 10 of FIG. 1 with a sorter 10a which sorts weighting factors as well as input label's grades. In the minimum-maximum computation circuit illustrated in FIG. 8, the weighting factor output circuit 63, the comparator 64 and the gates 66, 67 of FIG. 1 are all removed. Furthermore, in the alternative minimum-maximum circuit of FIG. 8, weighting factor-associative-bit-groups generating circuit 61 in FIG. 1 is replaced by a weighting-associative-bit-groups memory 61a having a simpler structure and timing controller 65 in FIG. 1 is replaced by another type timing controller 65a having a simpler structure.

In the modified minimum-maximum computation circuit illustrated in FIG. 8, the weighting factors are sorted in sorter 10a together with the input label's grades. Sorter 10a provides sorted weighting factors to Grade bus 51 with the sorted input label's grades to perform a minimum-maximum computation by accessing rule ROM 20. In this way, weighting factor output circuit 63 may be removed by treating the weighting factors as if they were part of the input label's grades. To do so, discriminators, hereinafter referred to as "weighting factors code," are attached to each of the weighting factors to discriminate them from one another as was the case for input label's grades. Further, discriminators of one bit are attached to both the weighting factors codes and input label's codes as most significant bits (MSB's) to differentiate them from one another.

The associative-bit-groups selecting circuit 62 receives the MSB of the input label's code and the weighting factors code which are provided by sorter 10a on Label Code bus 52 during a minimum-maximum operation including a memory access to rule ROM 20. The associative-bit-groups selecting circuit 62 outputs the rule-associative-bit-groups which are provided by rule ROM 20 on bus 68 when the MSB is a predetermined value included in the input label's codes (for example "0"). The associative-bit-groups selecting circuit 62 outputs the weighting-associative-bit-groups which are provided by weighting-associative-bit-groups memory 61a on bus 68, when the MSB is a predetermined value included in the weighting factors codes (for example "0"). The weighting-associative-bit-groups memory 61a may be implemented by ROM or RAM and stores weighting factor-associative-bit-groups in each memory area which is addressed by a corresponding weighting factors code. Weighting-associative-bit-groups memory 61a outputs stored data to the associative-bit-groups selecting circuit 62 when memory 61a receives weighting factors code which are provided by sorter 10a to its address terminal through Label Code bus 52 during a minimum-maximum operation which includes memory access to the rule ROM 20.

As was the case in FIG. 1, it is assumed that a total number of the non-zero grades which are included in the input label's codes sorted in sorter 10a is sixteen and the weighting factors applied to the corresponding rules are nine discrete values ranging from 0/8 to 8/8, wherein there is a difference of 1/8 between the weighting factors. It is also assumed that a structure of sorter 10a is the same as was illustrated in FIG. 7 except that nine stages of grade and code registers are added for storing the nine weighting factors and associated weighting factors codes in addition to the sixteen stages of the grade and label code registers for storing sixteen non-zero grades and associated label codes. Each of the grade registers latches and transfers both of the input label's grades and weighting factors in the same manner as was previously explained during a description of FIG. 7 in which only their magnitude determines an order. Each of the label code registers latches and transfers both of the label codes and weighting factors codes in the same manner as was previously explained referring to FIG. 7.

FIG. 9 illustrates an example of initial values which are stored in the grade registers and the label code registers of each of the cascaded stages prior to the beginning of the sorting of the input labels and the weighting factors. Each of the nine initial hexadecimal values $00, $20, $40,.... $FF indicate each of the nine weighting factors 0/8, 1/8, 2/8, ... . 8/8 is stored in each of the nine grade registers of the preceding stages and the initial values $FF are stored in the sixteen grade registers of the following stages. Furthermore, each of the nine weighting factors codes of nine bits width $100, $120, $140, . . . $1FF is stored in each of the label code registers of the preceding nine stages. Each of the nine weighting factors codes includes an eight bit discriminator of the corresponding weighting factor itself for discriminating the weighting factors codes from one another and one bit discriminator of MSB for discriminating the weighting factors codes from the input label's codes. Additionally, an appropriate value of nine bits width, for instance $000, is stored in each of the label code registers of the following sixteen stages. In the example illustrated in FIG. 9, the label codes corresponding to the input label's grades to be sorted include an eight bit section for discriminating label codes from each other and a MSB "0" for discriminating the label codes from the weighting factors codes.

When the input label's grades begin to appear on Grade bus 51 together with the associated label codes which appear on Label Code bus 52, the same sorting operation as previously described with respect to FIG. 7 will be initiated. In this sorting operation, the input label's grades stored in the grade registers and the weighting factors already stored in the grade registers are treated in the same manner. In the sorting operation, the input label's grades are latched in the grade registers and are shifted to subsequent grade registers, but the weighting factors already stored in the grade registers are only shifted to the subsequent grade registers. In this sorting operation, the weighting factors stored in the grade registers of the preceding eight stages with the exception of the first stage are shifted to another grade register of a following stage when the input label's grades are newly latched in the grade registers.

After the sorting of input label's grades and the weighting factors are finished, the sorted input label's grades and weighting factors are provided by the sorter 10a to Grade bus 51 in their increasing magnitude order. The associated input label's codes and weighting factor's codes are output to Label Code bus 52 when the input label's grades and the weighting factors are also provided. Rule ROM 20 outputs rule-associative-bit-groups only when rule ROM 20 receives an input label's code of nine bits having a MSB equal to "0" at its address input terminal. Similarly, the weighting factor-associative-bit-groups memory 61a implemented by ROM or RAM outputs the weighting factor-associative-bit-groups only when memory 61a receives the weighting factors code of nine bits having a MSB equal to "1" at its address input terminal. The associative-bit-groups selecting circuit 62 receives only a MSB of the code of nine bits on Label Code bus 52 to selectively outputs the rule-associative-bit-groups which are provided by rule ROM 20 on bus 68 when the MSB is "0", and selectively outputs the weighting factor-associated-bit groups which are provided by the weighting factor-associative-bit-groups memory 61a to bus 68 when the MSB is "1".

The implementation of the invention described herein is provided by way of example only. However, many other implementations may exist for executing the function described herein. For example, in the modified minimum-maximum computing circuit illustrated in FIG. 8, it is possible to modify a scheme to output the input label's grades and the weighting factors in their decreasing magnitude order by replacing the minimum-maximum calculating portion that includes the minimum-maximum detecting circuits 41 through 49 and the grade registers 31 through 39 with the minimum-maximum calculating portion similar to that illustrated in FIG. 6.

A special operation may be provided for zero grades for reducing size of hardware and computation time. However, such a special operation can't necessarily be performed on the zero grades, if a reduction of size of hardware or computation time is not a critical problem.

It will be also possible to define an appropriate threshold value larger than zero such that only the grades equal or larger than the threshold value can be treated exceptionally in the same manner as was the case on the zero grades. An example is described in which values ⅛ through ⅝ are defined as the weighting factors. However, values ⅞ through ⅞ or other values having appropriate steps and intervals can be defined as the weighting factors.

An example is also provided in which each of the following stages of the computation part including each of the minimum-maximum detectors 41 through 49 and each of the registers 31 through 39 are arranged for each of the output channels. However, only a single minimum-maximum detector and single resister can be provided to form a single following stage to be used by each of the output channels to reduce size of the hardware if an increase in computation time is allowable.

Also, an example is provided in which the input labels sorter and the input label's grades computation circuit in the preceding stage are connected serially to perform the computing and the sorting of input label's grades in real time. Additionally, it may be possible to locate a buffer memory between the computation circuit and the sorter so that the sorter may start sorting after computation is finished for all input label's grades if the reduction of the whole computation time is not a critical problem.

Furthermore, in the minimum-maximum computing circuit illustrated in FIG. 8, the associated-bit-groups selecting circuit 62 may be removed by connecting the outputs of rule ROM 20 and the weighting factor-associative-bit-groups memory 61a together and by holding the non-selected output signal lines in high impedance state according to the MSB of the input label's codes and weighting factors codes. Also, in the minimum-maximum computation circuit illustrated in FIG. 1, the associative-bit-groups selecting circuit 62 may be removed in the same manner.

As well, in the minimum-maximum computing circuit illustrated in FIG. 8, an example is explained in which a rule memory for storing fixed rules is implemented by rule ROM 20, while the weighting factor-associated-bit-groups memory 61a is implemented by RAM to allow the stored data to be modified later. However, both rule ROM 20 and the associated-bit-groups selecting circuit 62 may be removed by storing both of the rule-associative-bit-groups and the weighting factor-associative-bit-groups in separate memory areas of a single RAM in which the different memory areas are discriminated by MSBs to indicate their separated address.

As has been described in detail, the minimum-maximum computation circuit for fuzzy inference of the present invention provides a significant reduction in computation time, because duplicative operations for comparing magnitude of input label's grades for each fuzzy rules are eliminated by sorting input label's grades included in all fuzzy rules in their magnitude order only once before the minimum-maximum detection operation is executed.

Furthermore, according to the minimum-maximum computation circuit for fuzzy inference of the present invention, weighting factors to be applied to some fuzzy rules can be easily set and changed later to adapt more suitably to a system to be controlled using fuzzy inference. This flexibility is especially important because the multiplication of minimum-maximum values by weighting factors for some rules may be replaced by approximate minimum-maximum computation for input label's grades.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. In a fuzzy inference system comprising a plurality of fuzzy rules including input labels as antecedents and output labels as consequents, a minimum-maximum computing circuit for fuzzy inference for executing minimum-maximum operations on input label grades, the minimum-maximum computing circuit comprising:

a rule memory for storing rule-associative-bit-groups in memory areas, the memory areas being addressed by label codes, the label codes for discriminating among said input labels, each of said rule-associative-bit-groups comprising at least one coded rule, each of the at least one coded rule including a plurality of valid/invalid bits arranged in a predetermined order, each of the plurality of valid/invalid bits associated with an input label, each of the plurality of valid/invalid bits indicating an antecedent inclusion status of a corresponding input label;

an input label sorting means for sorting said input label grades and correlated label codes in order of grade magnitude and outputting sorted input label grades in order of magnitude, said input label sorting means simultaneously outputting said correlated label codes to be provided to an address input of said rule memory for reading said rule-associative-bit-groups;

a weighting factor outputting means for outputting weighting factor values in order of magnitude to be applied to at least one of said plurality of fuzzy rules;

a weighting factor-associative-bit-groups generating means for storing predetermined weighting factors and generating weighting factor-associated-bit-groups comprising an arrangement of valid/invalid bits for indicating whether each of said predetermined weighting factors stored by the weighting factor-associated-bit-groups generating means is equal or not to said weighting factor values generated by said weighting factor generating means;

a selecting means for comparing each of the input label grades output from said input label sorting means and each of the weighting factor values output from said weighting factor output means to select one of said rule-associative-bit-groups output from said rule memory and said weighting factors-associative-bit-groups output from said weighting factor-associative-bit-groups generating means according to the result of said comparison, said selecting means also selecting one of said input label grades output from said input label sorting means and selecting weighting factor values output from said weighting factor output means according to the result of said comparison; and a minimum-maximum detecting means being arranged for each of said output labels for detecting minimum-maximum values for each of said output labels, said minimum-maximum detecting means first detecting information about minimum values among said input label grades and weighting factors selected by said selecting means, said detection of information being carried out for each of said rules included in each of said output labels according to whether a significant valid bit appeared first or last in each of said coded rules, said minimum-maximum detecting means then detecting a maximum value among said minimum values for each of said rules included in each of said output labels according to said detected information about the minimum values.

2. The minimum-maximum computing circuit of claim 1, further comprising:

means for detecting a predetermined number of maximum values in decreasing order, said maximum values detected for each of the output labels as a result of minimum-maximum competition.

3. The minimum-maximum computing circuit of claim 2, wherein said predetermined number is equal to two.

4. The minimum-maximum computing circuit of claim 3, wherein:

said input label sorting means outputs sorted input label grades in order of increasing magnitude;

said weighting factor outputting means outputs weighting factors in order of increasing magnitude; and said minimum-maximum detecting means detecting said information about the minimum values according to whether said significant valid bit appeared first in each of said coded rules.

5. The minimum-maximum computing circuit of claim 3, wherein:

said input label sorting means outputs sorted input label grades in order of decreasing magnitude;

said weighting factor outputting means outputs weighting factors in order of decreasing magnitude; and said minimum-maximum detecting means detecting said information about the minimum values according to whether said significant valid bit appeared last in each of said coded rules.

6. The minimum-maximum computing circuit of claim 5, wherein:

said input label sorting means further includes an exceptional operation means for sorting and outputting only input label grades of magnitude equal to or greater than a predetermined value, while excluding other input label grades from said sorting and outputting according to an invalid signal indicating each case, and supplying correlated input label codes to said rule memory to cause said rule memory to output correlated rule-associative-bit-groups; and said minimum-maximum detecting means further includes an exceptional operation means for enabling said minimum-maximum detecting means only for input label grades greater than said predetermined value included in said coded rule.

7. The minimum-maximum computing circuit of claim 6, where said predetermined value is a minimum value processed in said minimum-maximum computing circuit.

8. The minimum-maximum computing circuit of claim 7, wherein:

said input label sorting means receives said input label grades to be sorted successively from an input label grades estimator of preceding stages to operate in real time with said input label grades estimator.

9. The minimum-maximum computing circuit of claim 8, wherein said input label sorting means includes:

a plurality of cascaded grade registers each storing a predetermined initial value when initialized;

a plurality of grade transfer path making means each arranged to correspond to each of said grade registers for performing a grade operation selected from the group consisting of a first and second operation and a no-operation selectively, the first operation making a data transfer path from a grade bus to a corresponding grade register, the second operation making a data transfer path from an adjacent grade register to the corresponding register, said input label grades to be sorted being transferred on said grade bus said input said input label sorter;

a plurality of cascaded label code registers each arranged corresponding to each of said grade registers for storing input label codes to discriminate input labels from each other;

a plurality of label code transfer path making means each arranged to correspond to each of said label code registers for performing a label operation selected from the group consisting of a third and fourth operation and a no-operation selectively, the third operation making a data transfer path from a label code bus to a corresponding label code register, the fourth operation making a data transfer path from an adjacent label code register to the corresponding label code register, said label code being transferred on said label code bus to said input label sorter;

a transfer controlling means arranged to correspond to said grade transfer path making means and said label code transfer path making means for selecting the grade operation and selecting the label operation, said transfer controlling means comprising a comparator for magnitude comparison of grades appearing on said grade bus, a logic circuit for outputting selection instructions to said grade and label code transfer path making means for selecting the grade operation and selecting the label operation said transfer controlling means generating the selection instructions according to said magnitude comparison of grades in said transfer controlling means and an adjacent transfer controlling means;

wherein said logic circuit:

A. outputs said selection instructions to select said first operation, if said magnitude comparison made in said transfer controlling means is a first result and said magnitude comparison made in said adjacent transfer controlling means is a second result different from said first result;

B. outputs said selection instructions to select said second operation, if said magnitude comparison made in said transfer controlling means and said adjacent transfer controlling means are said first result; and C. outputs said selection instructions to select said no-operation, if said magnitude comparison made in said transfer controlling means is said second result, regardless of said adjacent transfer controlling means.

10. In a fuzzy inference system comprising a plurality of fuzzy rules including input labels as antecedents and output labels as consequents, a minimum-maximum computing circuit for fuzzy inference for executing minimum-maximum operations on input label grades, the minimum-maximum computing circuit comprising:

a rule memory for storing rule-associative-bit-groups in memory areas, the memory areas being addressed by label codes, the label codes for discriminating among said input labels, each of said rule-associative-bit-groups comprising at least one coded rule, each of the at least one coded rule including a plurality of valid/ invalid bits arranged in a predetermined order, each of the plurality of valid/invalid bits associated with an input label, each of the plurality of valid/invalid bits indicating an antecedent inclusion status of a corresponding input label;

a weighting factors-associative-bit-groups memory for storing weighting factors-associative-bit-groups in memory areas accessed by weighting factors codes for discriminating weighting factors from each other, said weighting factors being applied to at least one of said fuzzy rules;

an input labels and weighting factors sorting means for sorting said input label grades and said weighting factors together with correlated input label codes and correlated weighting factor codes according to the order of magnitude of said input label grades and weighting factors, and outputting said sorted input label grades and weighting factors in magnitude order, said input label sorting means simultaneously outputting said correlated input label codes and said correlated weighting factor codes to be provided to an address input terminal of said rule memory and said weighting factors-associative-bit-groups memory to cause reading out of said rule-associative-bit-groups and weighting factors-associative-bit-groups, each of the bits of said rule-associative-bit-groups comprising each of said coded rules when read out successively; and a minimum-maximum detecting means being arranged for each of said output labels for detecting minimum-maximum values for each of said output labels, said minimum-maximum detecting means first detecting information about minimum values among said input label grades and weighting factors read out from said rule memory and said weighting factors-associative-bit-groups memory, said minimum-maximum detecting means detecting information for each of said rules included in each of said output labels according to whether a significant valid bit appeared first or last in each of said coded rules, said minimum-maximum detecting means then detecting a maximum value among said minimum values included in each of said output labels according to said detected information about the minimum values.

11. The minimum-maximum computing circuit of claim 10 further comprising a means for detecting a predetermined number of maximum values in decreasing order among maximum values detected for each of the output labels as a result of minimum-maximum computation.

12. The minimum-maximum computing circuit of claim 11 wherein the predetermined number is two.

13. The minimum-maximum computing circuit claim 12, wherein:

said input label and weighting factors sorting means further includes an exceptional operation means for sorting and outputting only input label grades of magnitude equal to or greater than a predetermined value, while excluding other input label grades from said sorting and outputting according to an invalid signal indicating the case, and supplying correlated input label codes to said rule memory to cause to output correlated rule-associative-bit-groups from said rule memory; and said minimum-maximum detecting means further includes an exceptional operation means for enabling said minimum-maximum detecting means only when input label grades included in the correlated coded rule are greater than said predetermined value.

14. The minimum-maximum computing circuit for of claim 13 wherein said predetermined value is a minimum value processed in said minimum-maximum computing circuit.

15. The minimum-maximum computing circuit of claim 14 wherein said input labels and weighting factors sorting means receives said input label grades to be sorted successively from an input label grades estimator of a preceding stage to operate in real time with said input label grades estimator.

16. The minimum-maximum computing circuit of claim 15, wherein said input label sorter includes:

a plurality of cascaded grade registers each storing a predetermined initial value when initialized;

a plurality of grade and weighting factor transfer path making means each arranged to correspond to each of said grade registers for performing one grade operation selected from the group consisting of three operations comprising a first and a second operation and a no-operation selectively, a data transfer path from a grade bus to the corresponding grade register being made under said first operation, a data transfer path from adjacent grade register to the corresponding one being made under said second operation, said input label grades to be sorted being transferred on said grade bus to said input label sorter;

a plurality of cascaded code registers each arranged to correspond to each of said grade registers for storing input label codes to discriminate input labels from each other and weighting factor codes to discriminate weighting factors from each other;

a plurality of code transfer path making means each arranged to correspond to each of said code registers for performing one label operation selected from the group consisting of three operations comprising a third and a fourth operation and the no-operation selectively, a data transfer path from a label code bus to the corresponding code register being made under said first operation, a data transfer path from adjacent code register to the corresponding one being made under said second operation, said label code being transferred on said label code bus to said input label sorter;

a transfer controlling means arranged to correspond to said grade transfer path making means and said code transfer path making means for giving instruction for selecting one grade and one label operation;

said transfer controlling means comprising a comparator for comparing magnitude of said input label grade or said weighting factor stored in said corresponding grade register and a magnitude of said input label grade appearing on said grade bus, a logic circuit for outputting instruction to said grade and code transfer path making means for selecting one grade and one label operation, said instruction being generated according to a combination of a result of said comparison made in the present and an adjacent transfer controlling means; and said logic circuit:

A. outputting said instruction to select said first operation, if said result of comparison made in the present transfer controlling means is a first result and said result of comparison made in said adjacent transfer controlling means is a second result different from said first result;

B. outputting said instruction to select said second operation, if said result of comparison made in both the present and adjacent transfer controlling means are said first result; and C. outputting said instruction to select said no-operation, if said result of comparison made in the present transfer controlling means is said second result, regardless of the result of comparison made in said adjacent transfer controlling means.

\* \* \* \* \*